US007006433B1

(12) United States Patent
Dantu et al.

(10) Patent No.: US 7,006,433 B1
(45) Date of Patent: Feb. 28, 2006

(54) SYSTEM AND METHOD FOR TRANSPORTING IN/AIN SIGNALING OVER AN INTERNET PROTOCOL (IP) NETWORK

(75) Inventors: Ramanamurthy Dantu, Richardson, TX (US); Robert Wayne Davis, Dallas, TX (US); Thomas Lamar George, Jr., Plano, TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 737 days.

(21) Appl. No.: 09/651,307

(22) Filed: Aug. 30, 2000

Related U.S. Application Data

(60) Provisional application No. 60/155,041, filed on Sep. 21, 1999.

(51) Int. Cl.
*H04L 12/58* (2006.01)
*H04L 3/32* (2006.01)
(52) U.S. Cl. ............... 370/218; 370/352; 370/392; 370/522; 379/220.01; 379/221.08
(58) Field of Classification Search ............... 370/522, 370/395.52, 469; 379/90.01, 93.15, 220.01, 379/221.08, 221.09, 221.1, 221.11, 221.12
See application file for complete search history.

(56) References Cited

U.S. PATENT DOCUMENTS

| | | | | |
|---|---|---|---|---|
| 5,949,871 | A | * | 9/1999 | Kabay et al. ............... 379/229 |
| 6,137,806 | A | | 10/2000 | Martinez |
| 6,154,445 | A | * | 11/2000 | Farris et al. ............... 370/237 |
| 6,178,181 | B1 | * | 1/2001 | Glitho ...................... 370/467 |
| 6,324,183 | B1 | * | 11/2001 | Miller et al. ............... 370/467 |
| 6,584,190 | B1 | * | 6/2003 | Bressler ................... 379/230 |
| 6,625,170 | B1 | * | 9/2003 | Curry et al. ............... 370/467 |

FOREIGN PATENT DOCUMENTS

WO WO 00/35176 6/2000

OTHER PUBLICATIONS

IntelliNet Techologies; "SS7oIP Signaling Gateway—Enabling the Coexistence of SS7 and IP Technologies"; 10 pages; Copyright © 2000.

(Continued)

*Primary Examiner*—Alpus H. Hsu
*Assistant Examiner*—Justin M. Philpott
(74) *Attorney, Agent, or Firm*—Danamraj & Youst; Richard A. Mysliwiec; V. Lawrence Sewell

(57) ABSTRACT

A system and method for transporting IN/AIN signaling (e.g., SS7 signaling) over an IP-based network using Stream Control Transmission Protocol (SCTP), wherein a peer-to-peer protocol adaptation (PPA) structure is provided at a signaling node. The PPA structure includes an interworking functionality between an MTP3 layer and the SCTP messaging, and operates to provide a symmetrical MTP2 adaptation interface therebetween. The PPA interface functionality facilitates the implementation of network management capabilities included in the MTP3 layer such that the advantageous features of SS7 signaling are retained in the SCTP transport. The MTP2 adaptation interface functionality is processed locally with respect to the signaling node, rather than backhauling the associated signaling to an external node via an IP connection. The PPA structure may be provided at any signaling node operable to establish a virtual link across an IP connection such as, for example, a signaling gateway, an IP-compliant SCP or STP, et cetera.

8 Claims, 17 Drawing Sheets

OTHER PUBLICATIONS

Morneault, K., Kalla, M., Sidebottom, G., Dantu, R. and George, T.; "SS7 MTP2-User Adaptation Layer"; <draft-ietf-sigtran-m2ua-04.txt>; 40 pages; dated Mar. 2000.

George, T., Dantu, R., Kalla, M., Schwarzbauer, H.J., Sidebottom, G. and Morneault, K.; "SS7 MTP2-User Peer-to-Peer Adaptation Layer"; <draft-george-sigtran-m2peer-02.txt>; 13 two-sided pages; dated Jul. 14, 2000.

Sidebottom G., Ong, L., Mousseau, G., Rytina, I., Schwarzbauer, H.J., Morneault, K., Kalla, M. and Glaude, N.; "SS7 MTP3-User Adaptation Layer (M3UA)"; <draft-ietf-sigtran-m3ua-03.txt>; 47 pages; dated Jun. 2000.

Stewart, R. R., Xie, Q., Morneault, K., Sharp, C., Schwarzbauer, H.J., Taylor, T., Rytina, I., Kalla, M., Zhang, L. and Paxson, V.; "Stream Control Transmission Protocol"; <draft-ietf-sigtran-sctp-13.txt>; 83 pages; dated Jul. 2000.

George, T., Dantu, R., Kalla, M., Schwarzbauer, H.J., Sidebottom, G. and Morneault, K.; "SS7 MTP2-User Peer-to-Peer Adaptation Layer"; <draft-george-sigtran-m2peer-02.txt>; 20 pages; dated Jul. 14, 2000.

Auerbach, et al.; Signaling Backhaul Protocol; Internet Draft; IETF Network Working Group; Feb. 25, 1999; pp. 1-16.

Ong, et al.; Architectural Framework for Signaling Transport; Internet Draft; IETF Transport Work Group; Feb. 1999; pp. 1-12.

* cited by examiner

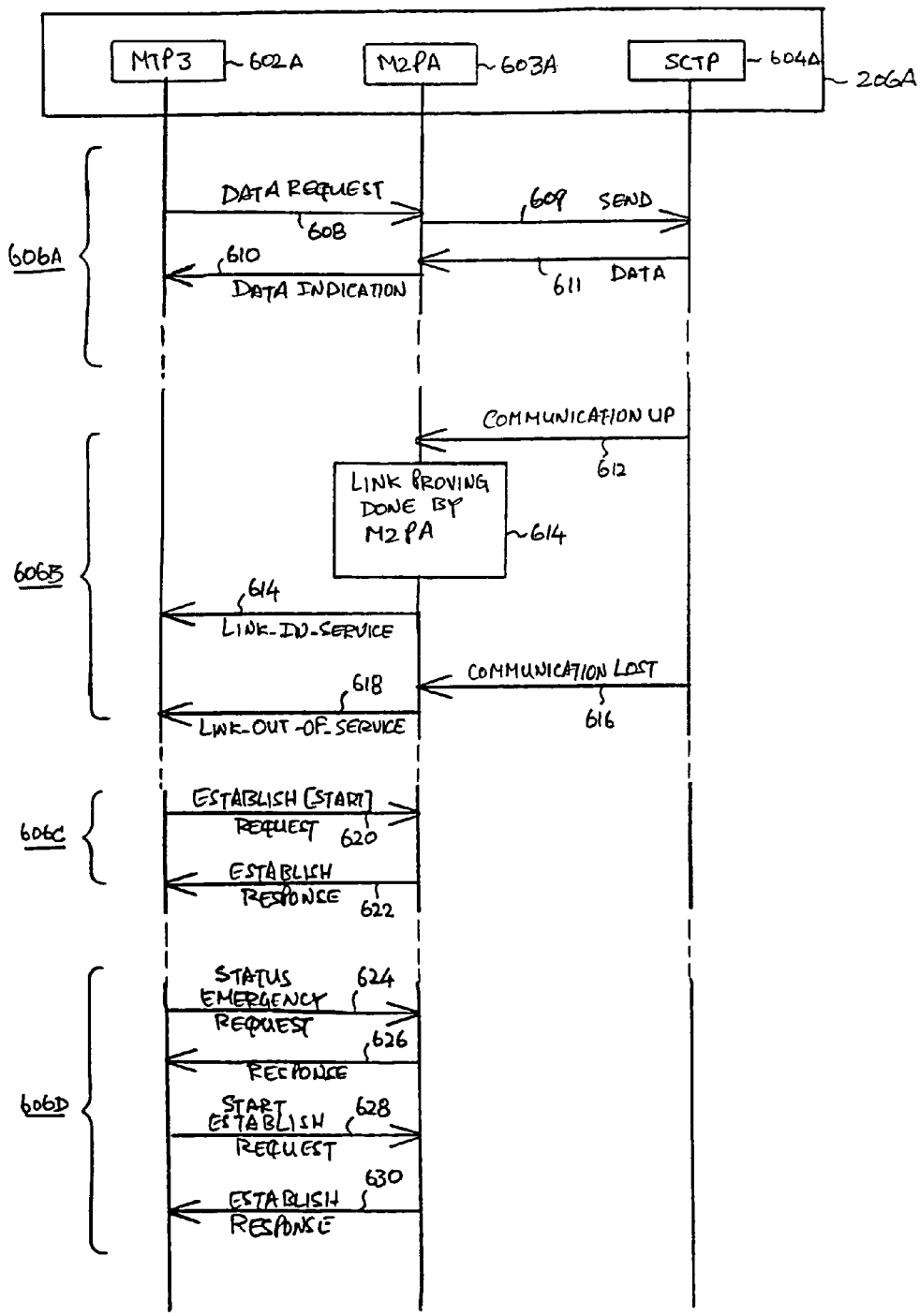

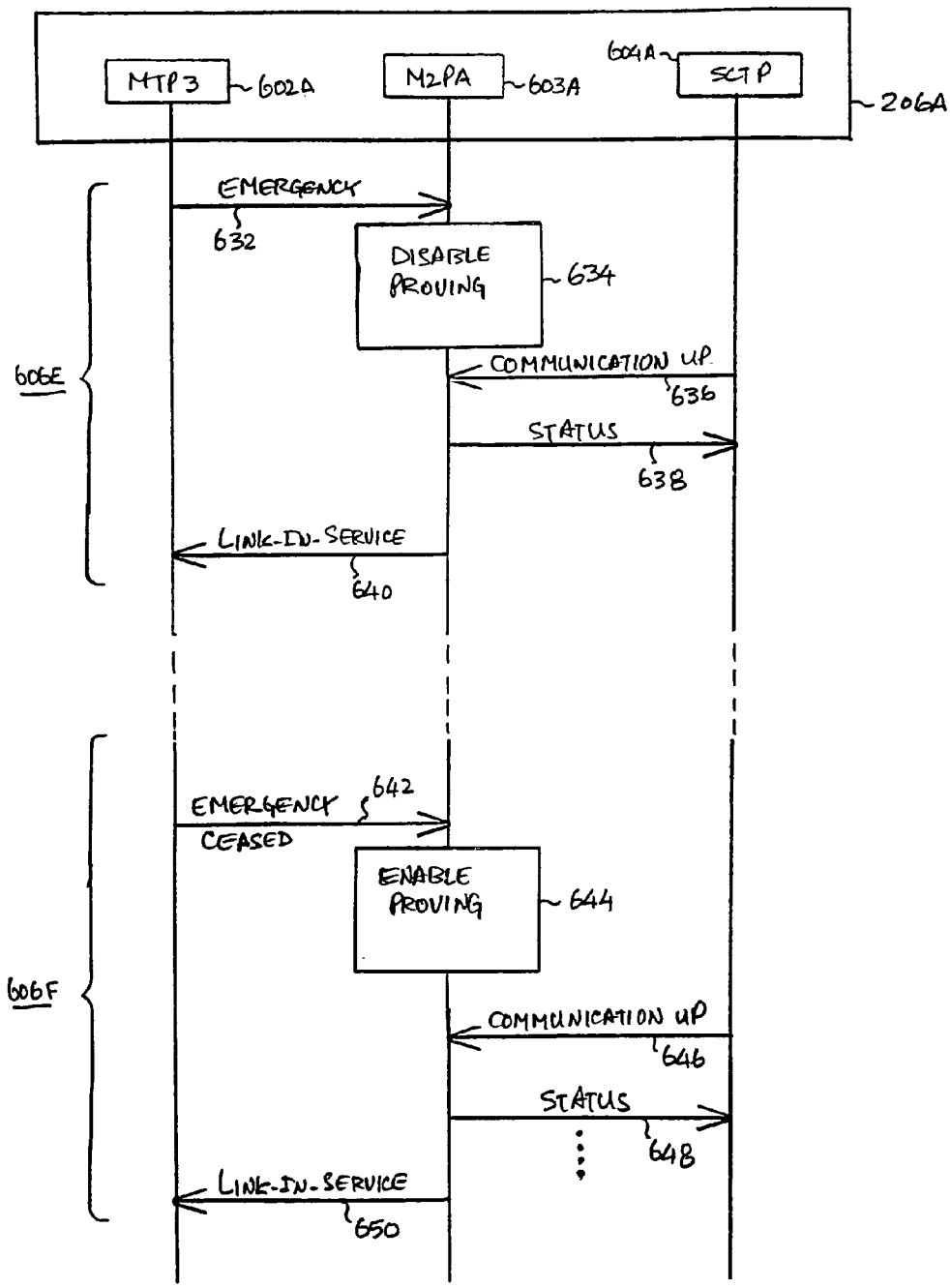

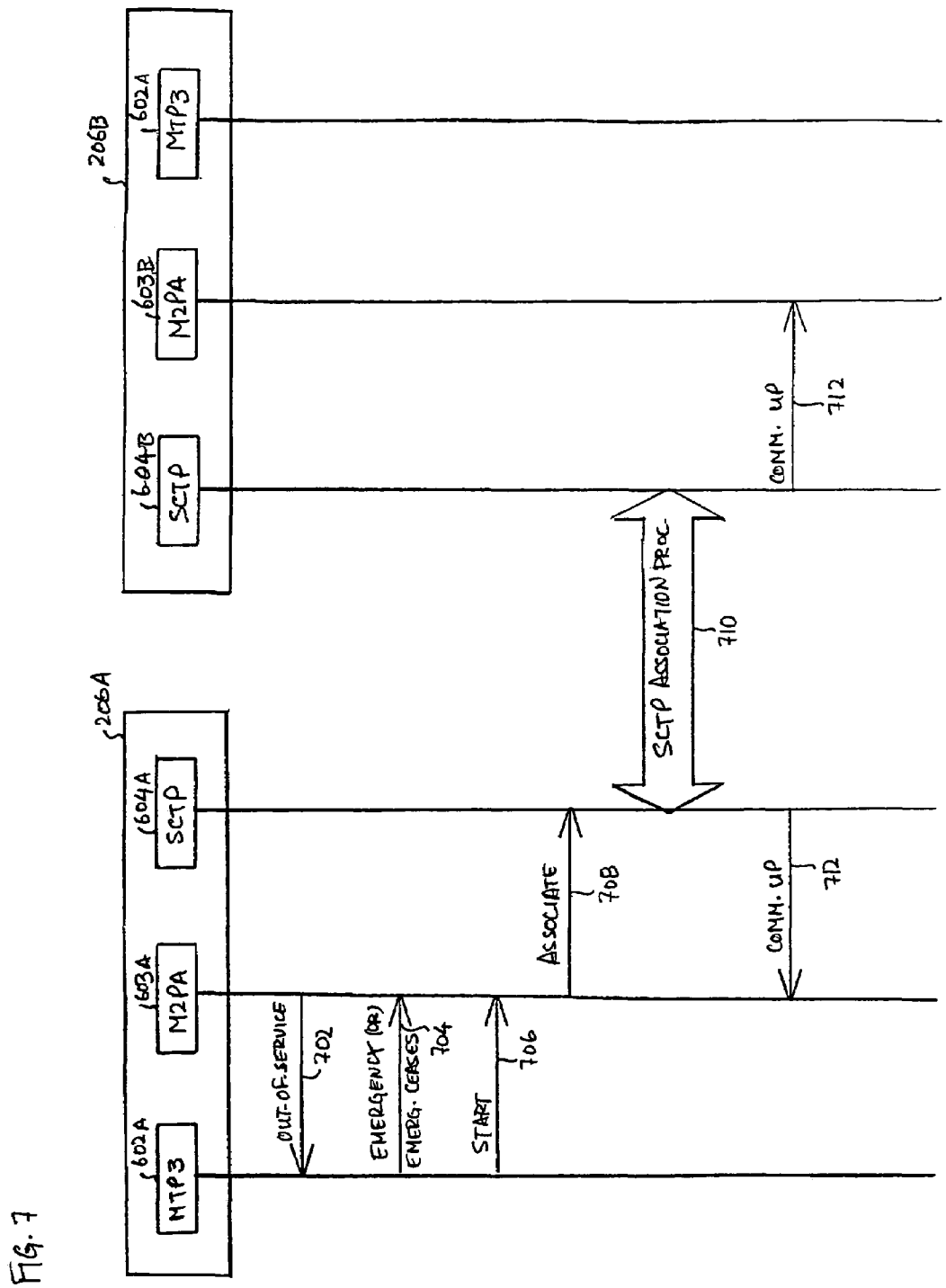

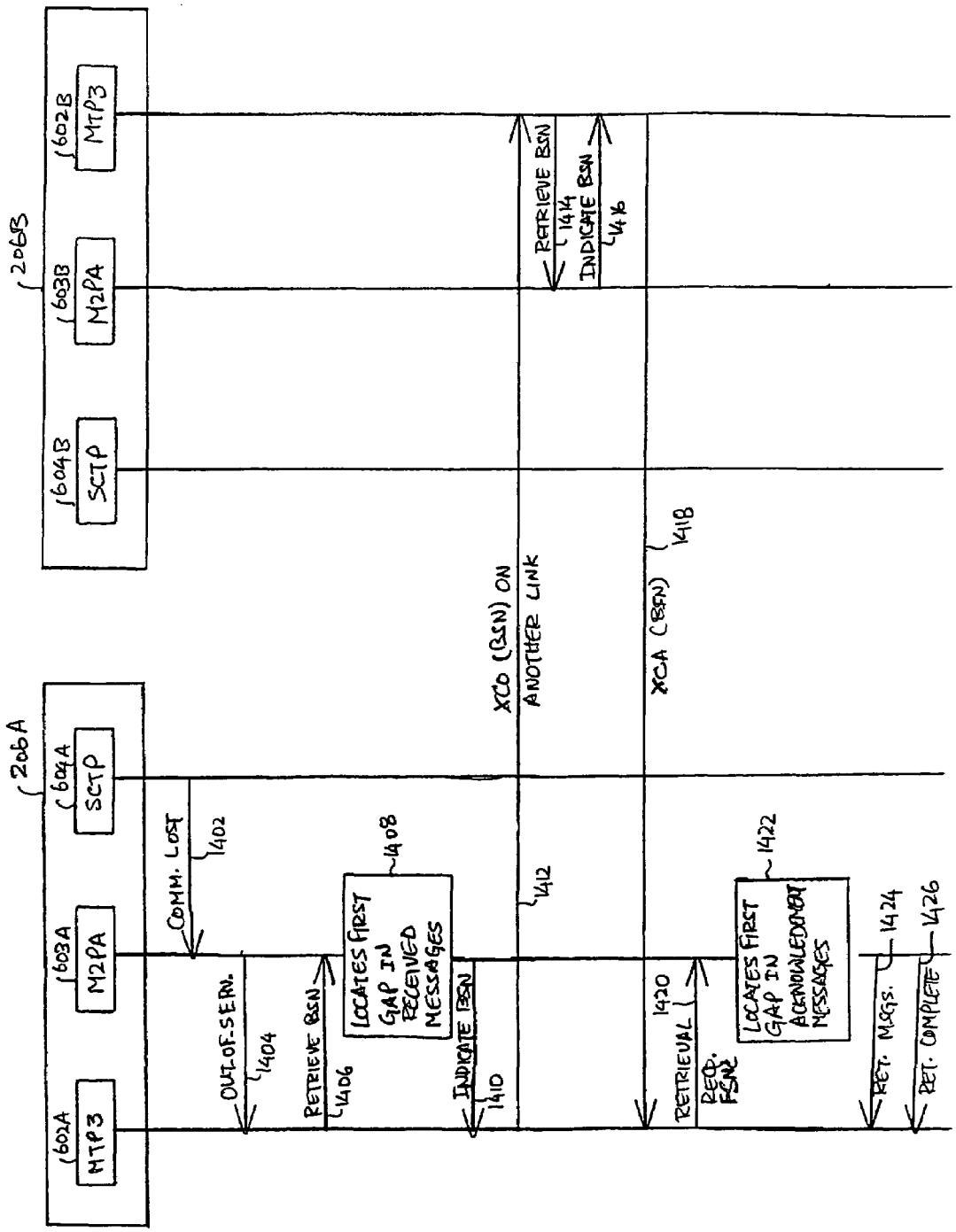

SYSTEM AND METHOD FOR TRANSPORTING IN/AIN SIGNALING OVER AN INTERNET PROTOCOL (IP) NETWORK

PRIORITY STATEMENT UNDER 35 U.S.C. §119(e) & 37 C.F.R. §1.78

This nonprovisional application claims priority based upon the following prior U.S. provisional patent application entitled: "Method And Apparatus For Transport Of AIN Messages Over IP Networks," Ser. No. 60/155,041 filed Sep. 21, 1999, in the name(s) of: Ram Dantu.

BACKGROUND OF THE INVENTION

1. Technical Field of the Invention

The present invention relates to networks for effectuating telecommunications signaling. More particularly, and not by way of any limitation, the present invention relates to a system and method for transporting IN/AIN signaling messages over a packet-switched network (PSN) such as an Internet Protocol (IP)-based network using an IP transport protocol.

2. Description of Related Art

Out-of-band signaling establishes a separate channel for the exchange of signaling information between call component nodes in order to set up, maintain and service a call in a telephony network. Such channels, called signaling links, are used to carry all the necessary signaling messages between the nodes. Thus, for example, when a call is placed, the dialed digits, trunk selected, and other pertinent information are sent between network switches using their signaling links, rather than the trunks which will ultimately carry the bearer traffic, i.e., conversation.

Out-of-band signaling has several advantages that make it more desirable than traditional in-band signaling. First, it allows for the transport of more data at higher speeds than multi-frequency (MF) outpulsing used in the telephony networks without it. Also, because of separate trunks and links, signaling can be done at any time in the entire duration of the call, not just at the beginning. Furthermore, out-of-band signaling enables signaling to network elements to which there is no direct trunk connection.

Signaling System No. 7 (SS7) provides a packet-based signaling architecture that has become the out-of-band signaling scheme of choice between telephony networks and between network elements worldwide. Three essential components are defined in a signaling network based on SS7 architecture. Signal Switching Points (SSPs) are basically telephone switches equipped with SS7-capable software that terminate signaling links. SSPs generally originate, terminate, or switch calls. Signal Transfer Points (STPs) are the packet switches of the SS7 network. In addition to certain specialized functions, they receive and route incoming signaling messages towards their proper destination. Finally, Service Control Points (SCPs) are databases that provide information necessary for advanced call-processing and Service Logic execution.

As is well known, SS7 signaling architecture, effectuated as a multi-layered protocol, is standardized under the American National Standards Institute (ANSI) and the International Telecommunications Union (ITU) to operate as the common "glue" that binds the ubiquitous autonomous networks together so as to provide a "one network" feel that telephone subscribers have come to expect. Furthermore, SS7 signaling has made it possible to provision a host of advanced services (or, Value-added Services) based on Intelligent Network (IN)/Advanced Intelligent Network (AIN) architectures in both wireless and wireline telecommunications networks.

Due to the phenomenal growth in popularity of the Internet, there has been a tremendous interest in using packet-switched network (PSN) infrastructures (e.g., those based on Internet Protocol (IP) addressing) as a replacement for, or as an adjunct to, the existing circuit-switched network (CSN) infrastructures used in today's telephony. From the network operators' perspective, the inherent traffic aggregation in packet-switched infrastructures allows for a reduction in the cost of transmission and the infrastructure cost per end-user. Ultimately, such cost reductions enable the network operators to pass on the concomitant cost savings to the end-users.

Additional factors that are driving the current trend in transporting the bearer traffic on integrated and/or hybrid networks are: improvements in the quality of Voice-over-IP (VoIP) telephony; the Internet phenomenon; emergence of standards; cost-effective price-points for advanced services via media-rich call management, et cetera. Some of the emerging standards in this area are the well known H.323 protocol, developed by the ITU, Session Initiation Protocol (SIP) or Internet Protocol Device Control (IPDC) by the Internet Engineering Task Force (IETF), or Simple/Media Gateway Control Protocol (SGCP or MGCP). Using these IP-based standards, devices such as personal computers can inter-operate seamlessly in a vast inter-network, sharing a mixture of audio, video, and data across all forms of packet-based networks which may interface with circuit-switched network portions.

To seamlessly integrate carrier-grade service architectures within IP-based networks, it has therefore become necessary to provide the capability to transport out-of-band signaling information (such as the SS7 signaling) on IP connections also. The state-of-the-art technology for facilitating such SS7-over-IP transport includes utilizing a connection-oriented IP transport protocol, called Stream Control Transmission Protocol (SCTP), for transmitting SS7 signaling messages across the network elements. Clearly, it is highly desirable that such transport not disrupt or degrade the capabilities of the signaling network, as they are essential in effectuating various advanced services. In particular, it is necessary for applications involving the higher layers of the SS7 protocol (e.g., Transaction Capabilities Application Part or TCAP, Signaling Connection Control Part or SCCP, or various User Parts such as ISDN User Part or ISUP, Telephony User Part or TUP, and Data User Part or DUP) to operate without any degradation when the SS7 messages are transported by means of SCTP. That is, message dialogs (e.g., call setup, etc.) in these applications should remain unaffected even when the messages are sent over IP (transport-independency). Accordingly, SS7-over-IP mechanisms must satisfy the following requirements which are traditionally provisioned in pure SS7 networks:

High reliability;

High availability;

Short error handling time; and

Extremely low error rates.

In general, the functionality of the lower Message Transfer Part (MTP) portion of the SS7 protocol (Level-2 MTP (MTP2) and Level-3 MTP (MTP3) layers, in particular) is responsible for link control and management, network reliability, error handling, etc. Consequently, the MTP functionality of the messages must be preserved as much as possible as they are transported over SCTP.

Several shortcomings and deficiencies exist in the state-of-the-art architectures for effectuating SS7-over-IP. In order to accommodate the MTP functionality, the existing schemes involve what is known as "backhauling" of the signaling messages over an IP network to an IP signaling gateway (SG) for processing. Not only does this procedure introduce asymmetrical behavior at the two ends of the SS7-IP interface, but additional complexity related to Operations and Administration of the backhauling path is also created accordingly. Further, it should be readily appreciated that where multiple SGs are provided and each is operable to receive backhauled signal traffic via its own path, such complexity can quickly become unmanageable.

Moreover, because the paths used for backhauling the signaling traffic necessarily involve IP connections, such paths are beset with the inherent unreliability of IP connectivity.

SUMMARY OF THE INVENTION

Accordingly, the present invention is directed to an innovative solution for transporting IN/AIN signaling (e.g., SS7 signaling) over an IP-based network using SCTP, wherein a peer-to-peer protocol adaptation (PPA) structure is provided at a signaling node. The PPA structure includes an inter-working functionality between the MTP3 layer and the SCTP messaging, and operates to provide a symmetrical MTP2-user adaptation interface (MTP2-user peer-to-peer adaptation, or M2PA, interface) therebetween. The PPA functionality facilitates the implementation of network management capabilities included in the MTP3 layer such that the advantageous features of SS7 signaling are retained while transported over the IP network using the SCTP protocol. The M2PA interface functionality is processed locally with respect to the signaling node, rather than backhauling the associated signaling to an external node via an IP connection. The PPA structure may be provided at any signaling node operable to establish a virtual link across an IP connection such as, for example, a signaling gateway, an IP-compliant SCP or STP, et cetera.

In one aspect, the present invention is directed to a telecommunications network element operable in the transport of signaling messages over an IP-based network. The network element comprises a first structure operable to effectuate signaling communication over a signaling network using a signaling protocol (e.g., common channel signaling such as SS7 signaling, or an access signaling protocol such as the Q.931 protocol). A second structure in the network element is operable to transport the signaling communication across a packet-switched network using an IP-based transport protocol such as the SCTP protocol. A PPA structure is included in the network element and is operably associated with the first and second structures. The PPA structure operates to convert the signaling communication between the signaling protocol messages and the IP-based SCTP messages. In accordance with the teachings of the present invention, the PPA structure includes a functionality to facilitate the first structure to locally process the signaling protocol's signaling messages without backhauling them to an external node.

In another aspect, the present invention is directed to a telecommunications network which comprises a first network portion operable to transport signaling messages using SS7 protocol and a second network portion based on IP. The second network portion is provided to be operable to transport the signaling messages using SCTP. A signaling gateway is disposed between the first and second network portions, the signaling gateway including a PPA structure operable to interwork between the SS7 protocol and SCTP messaging, wherein the PPA structure provides a symmetrical MTP2-like interface between MTP3 layer of the SS7 protocol and the SCTP protocol. The PPA structure includes the functionality to locally process functions associated with the MTP2-like layer at a local node.

In a yet further aspect, the present invention is directed to a method of transporting SS7 signaling information over an IP-based network. The method commences by establishing a virtual link across an IP connection between two nodes disposed in the network. The virtual link is provided to be operable to propagate messages using SCTP. Thereafter, the virtual link's integrity is verified by one or both of the two nodes which may be disposed in a client/server relationship. At each of the two nodes, an interworking process is effectuated between MTP3 functionality and the SCTP protocol by a PPA structure provided thereat. The PPA further operates to convert SS7 signal bearer traffic into a stream of SCTP messages. Subsequently, the virtual link is loaded with the stream of SCTP messages for propagation between the two nodes over the virtual link.

In a related aspect, the present invention provides a computer-accessible medium that is operable with a signaling node disposed in an IP-based network such as the network set forth hereinabove. The computer-accessible medium carries a sequence of instructions or operations (and/or data) which, when executed by a processing entity associated with the signaling node, causes the signaling node to perform a plurality of steps for transporting SS7 messages over IP connections as described above.

In yet another aspect, the present invention is directed to a link changeover method in an IP-based telecommunications network for transporting SS7 signaling information. The network includes a local node and a remote node, wherein each of the nodes includes an MTP3 structure, an M2PA structure, and an SCTP structure. Initially, an operational link is established between the local and remote nodes by creating one or more SCTP associations therebetween. Upon detecting, by either or both of the nodes, that a select condition related to the association (e.g., link failure, packet loss, Quality of Service (QoS) degradation, etc.) has occurred, the nodes engage in a procedure for exchanging message sequence number information on an alternative link established therebetween. Thereafter, messages are retransmitted over the alternative link, the messages starting at a predetermined sequence number based on the message sequence number information exchanged between the nodes.

BRIEF DESCRIPTION OF THE DRAWINGS

A more complete understanding of the present invention may be had by reference to the following Detailed Description when taken in conjunction with the accompanying drawings wherein:

FIGS. 6A and 6B depict various message flows for effectuating the M2PA layer structure in accordance with the teachings of the present invention;

FIG. 7 depicts a message flow diagram for effectuating link initialization in accordance with the teachings of the present invention;

FIG. 14 depicts a message flow diagram for effectuating link changeover in accordance with the teachings of the present invention.

DETAILED DESCRIPTION OF THE DRAWINGS

Figure 1:
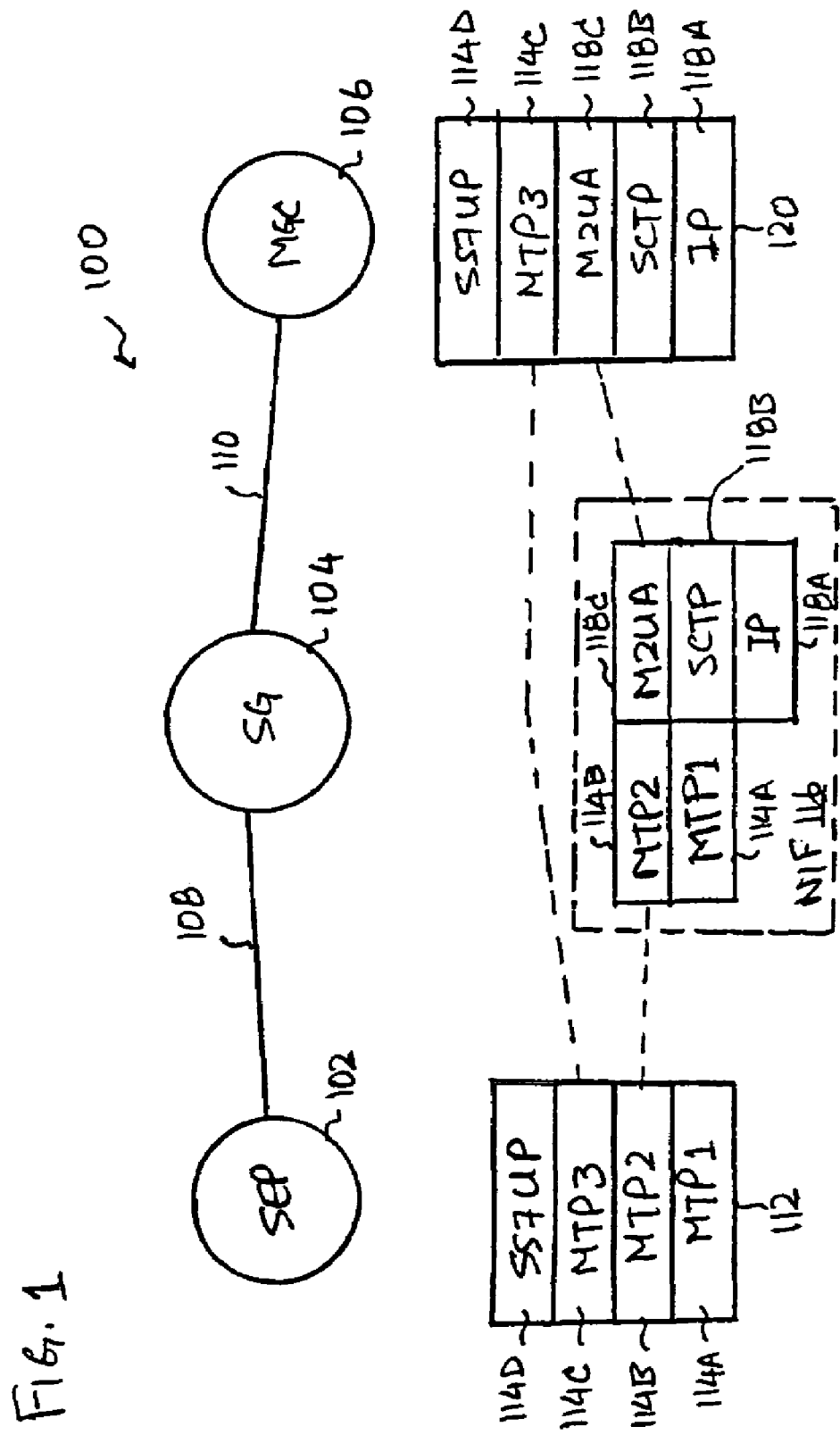
FIG. 1 depicts a network portion wherein SS7 messages are transported over an IP connection provided in a current architecture.

In the drawings, like or similar elements are designated with identical reference numerals throughout the several views thereof, and the various elements depicted are not necessarily drawn to scale. Referring now to FIG. 1, depicted therein is an exemplary network portion 100 wherein SS7 messages are transported over an IP connection provided in a current architecture. A signaling endpoint (SEP) 102 is coupled to a signaling gateway (SG) 104 via an SS7 path 108 which may involve one or more Signal Transfer Points (STPs) and multiple link sets in some implementations. A media gateway controller (MGC) 106 disposed in an IP network (not shown) is coupled to the SG 104 via an IP connection 110 which provides for the transport of signaling messages using an IP transport protocol such as the SCTP protocol. The IP connection path 110 may also involve multiple IP links as may be required.

SEP 102 is operable as a node in an SS7 network (not shown) that originates or terminates signaling messages, such as a central office (CO) switch. The SG 104 is operable as a signaling agent that receives/sends Switched Circuit Network (SCN) native signaling at the edge of the IP network. Accordingly, in this context, the SG 104 operates as a signaling point (SP) that has both an IP interface used for the transport of SS7 over IP, and an interface to the conventional SS7 network.

A conventional SS7 protocol stack structure 112 is provided at SEP 102 for effectuating SS7 signaling over the signaling path 106. Three Levels of MTP layers, MTP1 through MTP3 (reference numerals 114A through 114C, respectively), and one or more SS7 user parts such as Telephony User Part (TUP), Data User part (DUP), etc. (collectively referred to as SS7UP 114D) are accordingly provided in conformity with known SS7 standards.

The SG 104 is provided with a nodal interworking function (NIF) 116 for interfacing between the SS7 and IP network portions. MTP1 and MTP2 form a portion of the SS7 protocol stack structure for effectuating SCN's native signaling. In order to effectuate SS7-over-IP, an MTP2-User Adaptation (M2UA) layer 118C is provided as part of NIF 116 such that it interfaces to an SCTP layer 118B that sits on top of the underlying IP layer 118A.

The MGC node 106 disposed in the IP network is provided with a protocol stack structure 120 to be operable with the SG 104 for effectuating the SS7-over-IP messaging via the IP path 110. The M2UA layer 118C is included in the protocol stack structure 120 in order to interface to the SCTP layer 118B provided thereat. The upper SS7 layers, MTP3 layer 114C and SS7UP 114D, are also available as part of the protocol stack structure 120.

Additional description regarding the various elements forming the network arrangement 100 and the operation of the M2UA layer for effectuating SS7-over-IP transport in the current architecture may be found in a "work in progress" Internet Draft titled "SS7 MTP2-User Adaptation Layer" (draft-ietf-sigtran-m2ua-04.txt) which can be accessed at the URL <http:/www.ietf.org>associated with the IETF. This work in progress Internet Draft is incorporated by reference herein.

Those skilled in the art should realize upon reference hereto that solutions implementing the M2UA layer in relevant network elements (such as SGs, IPSPs, MGCs, et cetera) for facilitating SS7-over-IP involve the backhauling of signaling traffic through the IP network portion. That is, in the exemplary network arrangement described hereinabove, when a node such as the MGC 106 is required to process signaling messages involving MTP2 layer functionality, the processing is not performed at the MGC. Rather, it is carried out by sending the signaling traffic to the SG node 104 over the IP connection 110 for processing thereat and subsequently receiving the processed messages by the MGC 106 for SCTP transport. This backhauling operation introduces asymmetrical behavior at the two ends (SEP-SG end and SG-MGC end) of the SS7-IP interface as embodied by the SG 104. As alluded to in the Background section of the present patent application, such asymmetrical behavior introduces increased complexity relating to Operations and Administration of the additional link required for the backhauled signaling traffic. Furthermore, such additional links are in general unreliable because of the underlying IP-based transport employed, thereby compromising the overall reliability of the signaling network.

Figure 2:
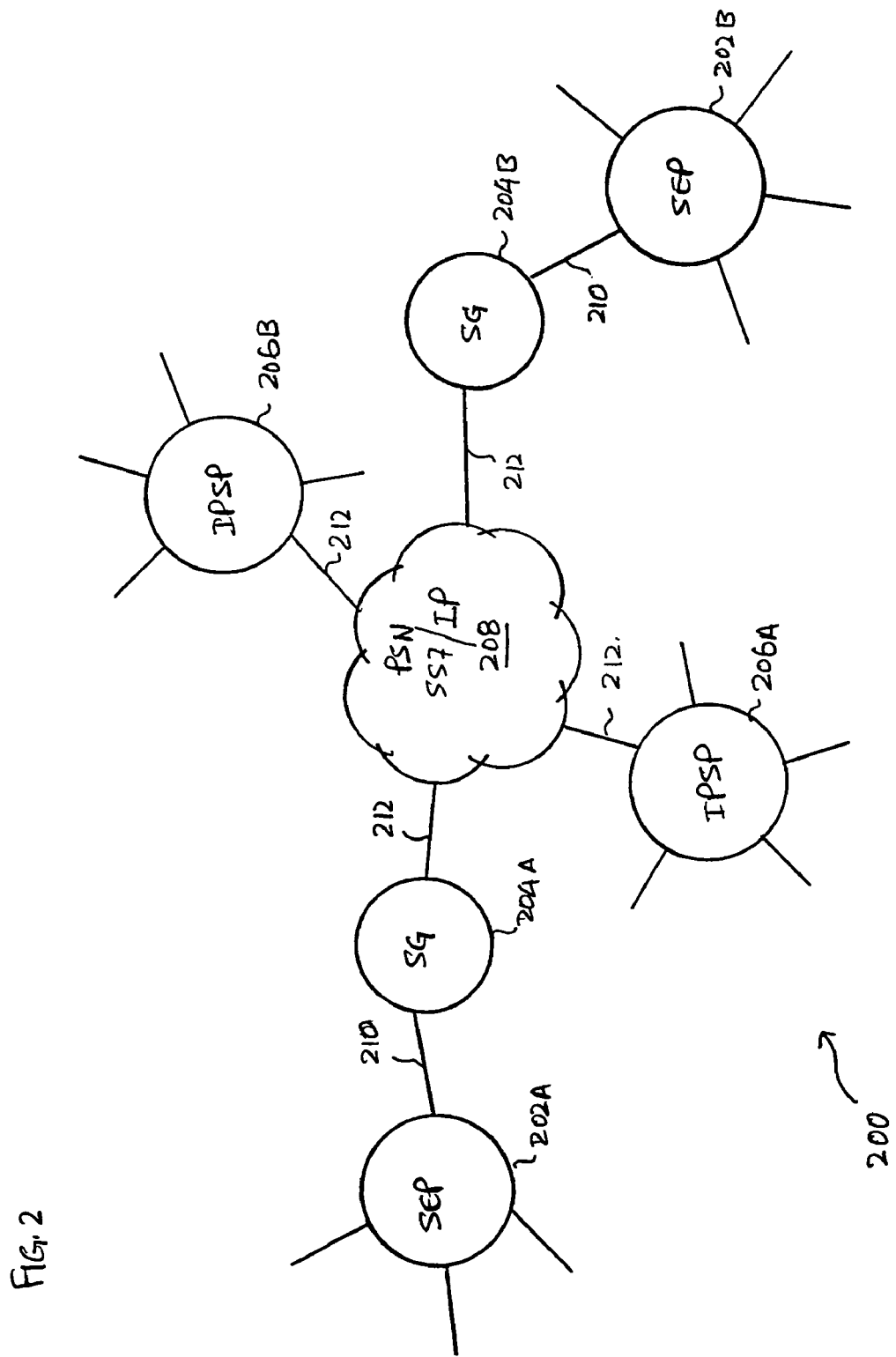
FIG. 2 depicts a telecommunications network having an SS7 signaling network portion and an IP-based network portion, wherein the teachings of the present invention are advantageously practiced.

FIG. 2 depicts an exemplary telecommunications network 200 having an SS7 signaling network portion and an IP-based network portion, wherein the teachings of the present invention may be advantageously practiced. Two SEP nodes 202A, 202B and a plurality of SS7 links or link sets associated therewith exemplify the SS7 signaling network portion. The IP-based network portion is exemplified by two IP-based SP nodes (IPSP 206A and 206B) and a packet-switched network (PSN) 208 operably associated therewith for providing IP-based SS7 message transport. Two SG nodes 204A, 204B are also included in 110 the exemplary telecommunications signaling network 200, which are operable to provide SS7-IP interfaces to the SEP nodes 202A and 202B, respectively. As will be described in greater detail hereinbelow, the various SG and IPSP nodes are provided with a peer-to-peer protocol adaptation (PPA) structure for facilitating SS7-over-IP transport without backhauling the signaling traffic.

As set forth above, the SEP nodes are operable with other nodes via SS7 link paths, of which link paths 210 disposed between the SEP and SG nodes are exemplary. The SG and IPSP nodes are coupled to the IP-PSN 208 via IP connection paths 212. As is well known, other nodes such as media gateways (MGWs), MGCs, et cetera, may also be included in the exemplary network 200. Moreover, the IPSP nodes are exemplary of various IP-interfaced nodes such as, e.g., IP signaling endpoints (IPSEPs), IP Signal Transfer Points (IPSTPs), IP Signal Switching Points (IPSSPs), IP Service Control Points (IPSCPs), and the like.

Figure 3A:
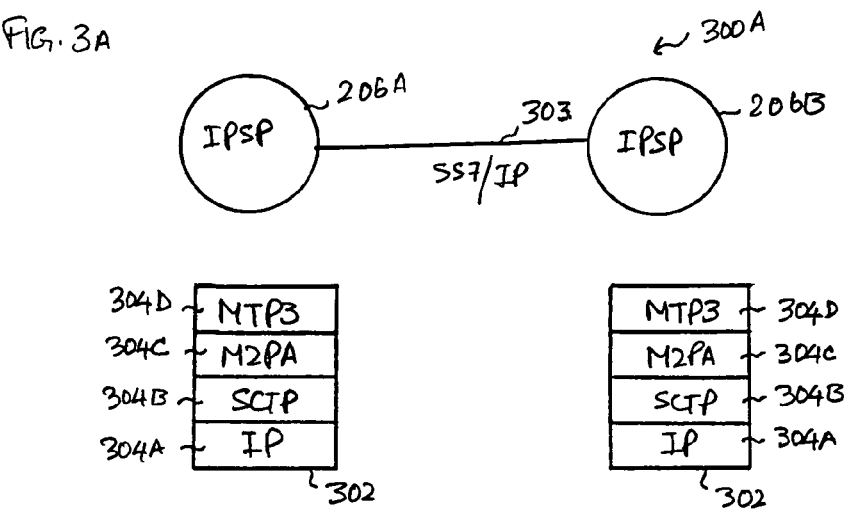
FIGS. 3A and 3B depict two exemplary embodiments of a network portion wherein SS7 messages are transported over an IP connection by utilizing a Level 2 MTP-User peer-to-peer adaptation (M2PA) layer structure provided in accordance with the teachings of the present invention.
Figure 3B:
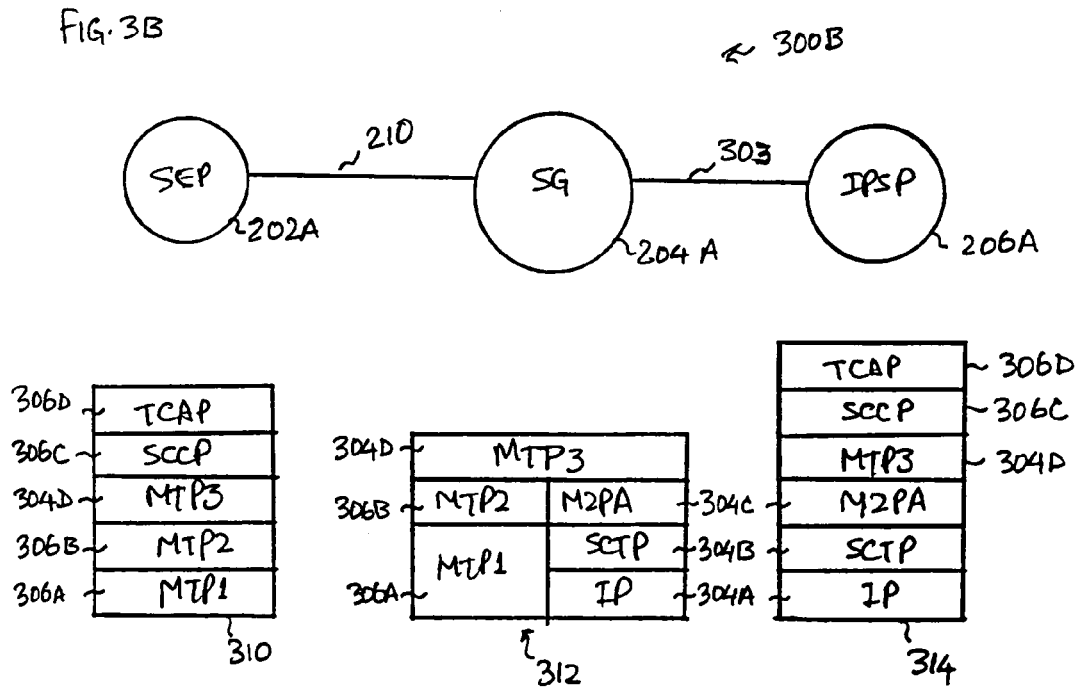

FIGS. 3A and 3B depict two exemplary network portions wherein SS7 messages are transported over IP by utilizing a Level 2 MTP-User peer-to-peer adaptation (M2PA) layer provided in accordance with the teachings of the present invention. The M2PA layer may preferably be implemented as a PPA structure in software, hardware, firmware, or in any combination thereof at any suitable node such as an IPSP or SG described hereinabove.

It should be recognized that the provisional patent application identified hereinabove and on which the priority of the present nonprovisional patent application is based includes a portion of a work in progress Internet Draft which refers to the M2PA layer as an "M2UA" layer although this layer's functionality is different from the functionality of the M2UA layer described hereinabove in reference to FIG. 1. The "M2UA" nomenclature was adopted in the work in progress Internet Draft at the time the provisional patent application was filed in order to be compliant with a broad umbrella "user adaptation" architecture then proposed under the IETF. Some of the definitions used the work in progress document forming a portion of the provisional patent application have since been modified and the current version of the work in progress Internet Draft (draft-george-sigtran-m2peer-02.txt; incorporated by reference herein) identifies the present invention's PPA functionality as M2PA and not M2UA. Accordingly, it should be understood that the "M2UA" functionality described as part of the provisional patent application referenced hereinabove is the same or essentially the same as the M2PA functionality described herein and is comprehended within the PPA structure and functionality of the present nonprovisional application.

Referring now in particular to FIG. 3A, the exemplary network portion 300A embodies two IPSP nodes 206A, 206B coupled together via an IP transport path 303 in a symmetrical peer-to-peer architecture for transporting SS7 messages in accordance with the teachings of the present invention. Each IPSP is provided with a protocol stack structure 302 which comprises an SS7 portion (a first structure) and an IP/SCTP portion (a second structure), wherein the PPA functionality of the present invention is preferably provided in the form of an interworking M2PA layer between the MTP3 layer and the SCTP layer. The M2PA layer thus operates so as to present the underlying SCTP layer at a node as a full MTP2 layer whose services can be used by the MTP3 layer at that node.

The protocol stack structure 302 provided at each IPSP accordingly includes: IP layer 304A, SCTP layer 304B, M2PA layer 304C, and MTP3 layer 304D. Those skilled in the art should recognize that although not explicitly shown in FIG. 3A, other SS7 layers such as the SCCP or User Parts (i.e., SS7UPs) may be present on top of the MTP3 layer 304D of the protocol stack structure 302.

In order to achieve seamless interworking at the MTP3 layer by way of the M2PA layer, all the primitives between MTP3 and MTP2 are supported in the PPA structure as embodied in the M2PA layer of the present invention in a presently preferred exemplary implementation thereof. Accordingly, an SCTP association (described hereinbelow in greater detail) created between two IP nodes (e.g., IPSPs 206A and 206B) operates as a virtual SS7 link therebetween for the transport of the MTP3 messages. Further, because the MTP specification requires that each node with an MTP3 layer be represented by an SS7 point code, the IPSP nodes provided in accordance herewith also have a point code, respectively.

FIG. 3B depicts another exemplary network portion 300B wherein the IP network elements are provided with the M2PA layer functionality in accordance with the teachings of the present invention. As set forth above, SEP 202A is operably linked to SG 204A via the SS7 link path 210, and is provided with a conventional SS7 protocol stack structure 310. Accordingly, the protocol stack structure 310 comprises the following layers in the exemplary embodiment depicted in FIG. 3B: MTP1 layer 306A, MTP2 layer 306B, MTP3 layer 304D, SCCP 306C, and TCAP 306D.

The SG node 204A (which is essentially an IPSP equipped with both traditional SS7 and IP network connections) is provided with an interworking protocol stack structure 312 including the PPA functionality by way of the M2PA layer 304C. The MTP3 layer 304D is provided as a user of both MTP2 and M2PA layers so as to support the SS7 and IP interfaces. The MTP1 layer 306A provided in the protocol stack structure 312 effectuates the signaling data link functionality required for establishing the SS7 link path 210. The SCTP and IP layers (reference numerals 304A and 304B, respectively) underlying of the M2PA layer 304C correspondingly effectuate the IP-based transport of the SS7 messages in accordance with the SCTP protocol.

The IPSP node 206A is coupled to the SG node 204A via the IP transport path 303 as described hereinabove with respect to FIG. 3A. In accordance with the teachings of the present invention, a protocol stack structure 314 comprising the symmetrical M2PA functionality is provided at the IPSP node 206A as previously described. Additional SS7 layers (SCCP 306C and TCAP 306D) are also included in the protocol stack structure for effectuating an IN/AIN-based service architecture.

Those skilled in the art should recognize that the exemplary network portions 300A and 300B are only illustrative of the various nodal arrangements that are possible. For example, some network configurations may involve IPSP nodes without traditional SS7 links that could use the protocol layers MTP3//M2PA//SCTP//IP to route SS7 messages in a network with all IP links. In yet another example, two SG nodes may be connected over an IP network to form an SG mated pair similar to the way STPs are provisioned in traditional SS7 networks (i.e., provisioning redundant pairs for increased reliability).

Figure 4A:
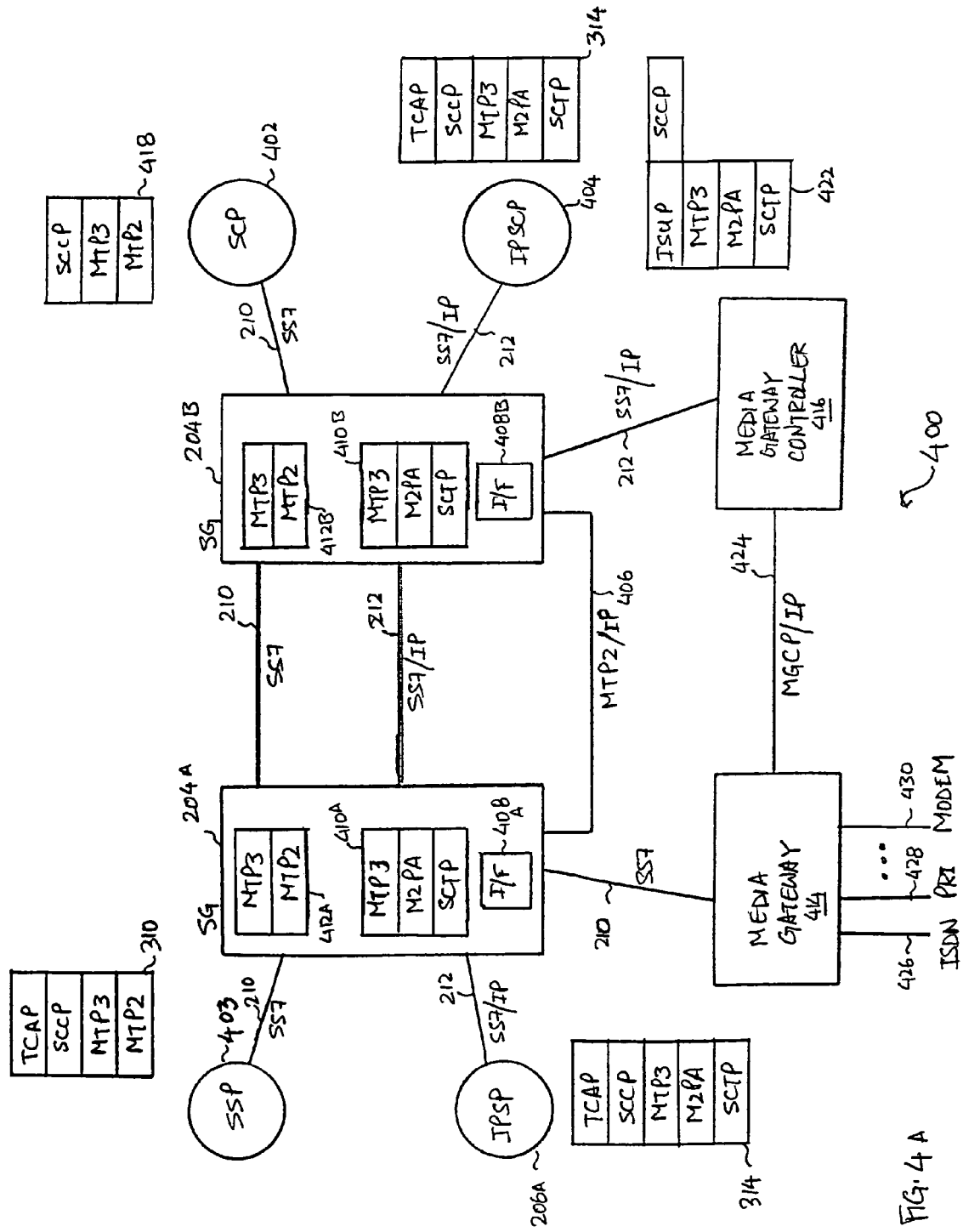
FIG. 4A depicts an exemplary arrangement of the various network elements wherein multiple signaling scenarios may be implemented in accordance with the teachings of the present invention.

Referring now to FIG. 4A, depicted therein is an exemplary arrangement 400 of the various network elements where multiple signaling network configurations may be implemented in accordance with the teachings of the present invention. Two SG nodes 204A and 204B are exemplified. Preferably, the functionality of the SG nodes may be compartmentalized such that pure SS7 connectivity may be provided between them via a traditional SS7 path 210 (which could include additional SS7 nodes disposed in a network). Accordingly, each SG node may be provided with a pure SS7 protocol stack structure for effectuating such SS7 connectivity. In FIG. 4A, reference numerals 412A and 412B refer to the pure SS7 protocol stack structures for nodes 204A and 204B, respectively.

Each SG node may further be provided with the symmetrical M2PA functionality of the present invention as part of its PPA structure for effectuating SS7-over-IP transport. Protocol stack structures 410A and 410B are accordingly provided at SG nodes 204A and 204B, respectively, for effectuating the IP connection path 212 therebetween. In addition, an MTP2/M2PA interface is provided at each SG node for effectuating MTP2 transport over IP via path 406, which transport does not involve MTP3 layer functionality. Reference numerals 408A and 408B exemplify such MTP2/M2PA interfaces provided with the SG nodes.

A traditional SSP 403 with its associated protocol stack 310 is coupled to the SG node 204A via link 210 for effectuating SS7 signaling. In similar fashion, an SCP node 402 having a protocol stack 418 is provided to be operable with the SG node 204B via the traditional SS link 210. Accordingly, a conventional SS7 signaling configuration involving the SSP and SCP nodes may be obtained by way of the coupled SG nodes.

Each of the SG nodes 204A, 204B is also preferably coupled to one or more appropriate IP-compliant SP elements for forming SS7-over-IP signaling network configurations. Thus, IPSP 206A is provided to be operable with the interworking protocol stack 410A of the SG node 204A. In similar fashion, an IPSCP node 404 is provided to be operable with the interworking protocol stack 410B of the SG node 204B.

Continuing to refer to FIG. 4A, the exemplary network arrangement 400 may preferably include an MGW node 414 coupled to the SG node 204A by means of the SS7 link path 210 which is effectuated using MTP1 and MTP2 layers. MGW 414 is operable to =interface with a plurality of media such as, for example, Integrated Services Digital Network (ISDN) 426, Primary Rate Interface (PRI) 428, and a modem 430. Accordingly, it should be appreciated that the access signaling protocol messaging associated with the ISDN/PRI media (e.g., Q.931), can be converted to the common channel SS7 messaging which may then be transported over the IP network in accordance with the teachings of the present invention.

The SG node 204B is coupled to an IP-MGC node 416 having a protocol stack structure 422, wherein the interworking PPA functionality is embodied in the M2PA layer thereof. The IP connection path 212 disposed between the SG and MGC nodes carries out the SCTP-based SS7-over-IP transport. A connection path 424 disposed between the MGW and MGC nodes is used for effectuating the transmission of the MGCP messaging over IP therebetween.

Figure 4B:
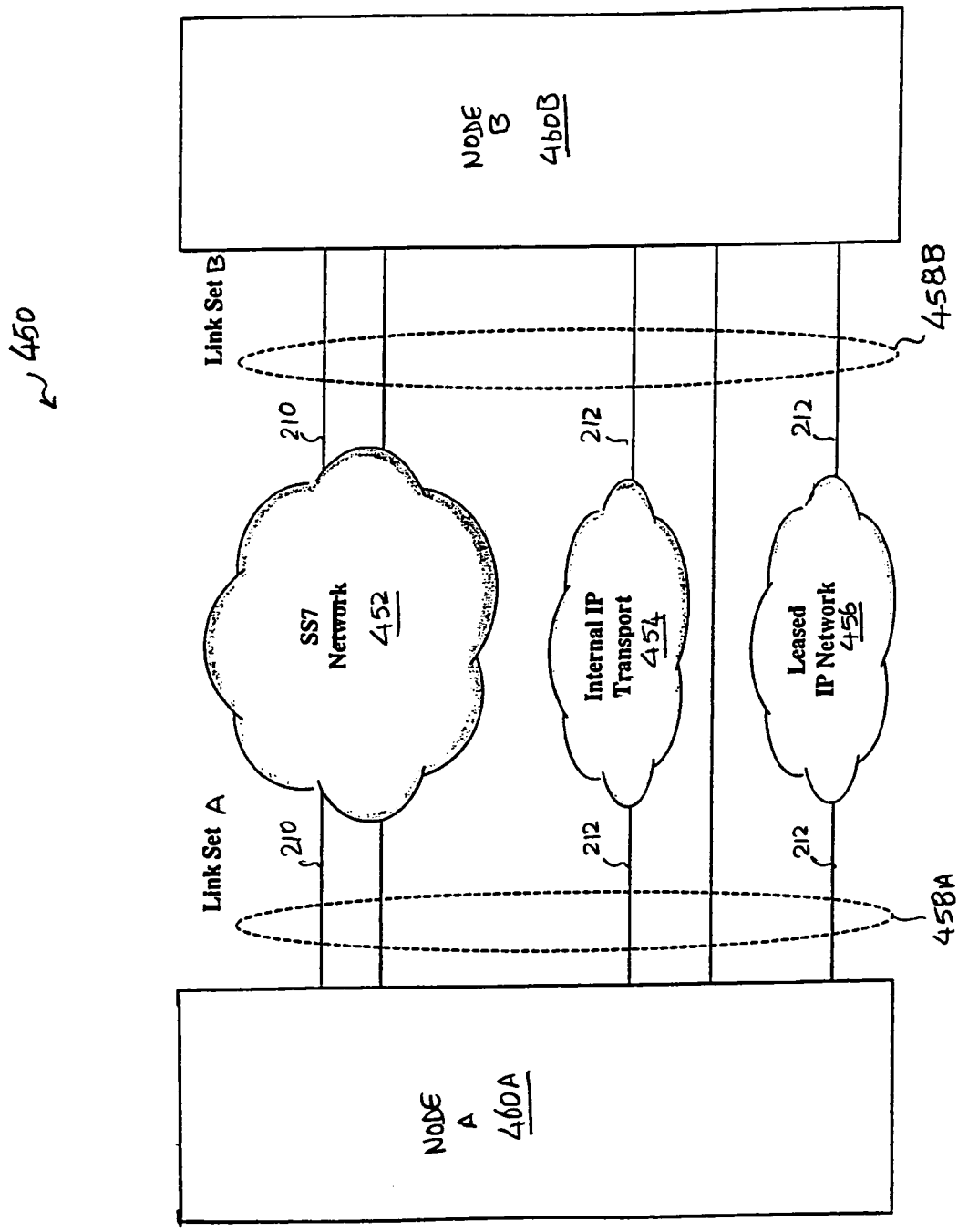
FIG. 4B depicts an exemplary link connection arrangement between two nodes wherein multiple alternative links may be advantageously implemented.

Referring now to FIG. 4B, depicted therein is a link connection arrangement between two network nodes where multiple alternative links may be advantageously implemented in a network arrangement such as the arrangement 400 described hereinabove with respect to FIG. 4A. Nodes 460A and 460B represent any two network elements depicted in FIG. 4A. For example, node 460A may comprise an SEP or SCP. Similarly, an STP or SCP may be provided as node 460B. Each node is provided with a link set which includes multiple links for the transport of SS7 messages. In FIG. 4B, node 460A is exemplified with link set 458A and node 460B is exemplified with link set 458B.

As described in greater detail in the foregoing, the link sets may be implemented using conventional SS7 configurations using SS7 link paths (e.g., reference numeral 210) or SS7-over-IP configurations involving links based on IP connection paths (e.g., reference numeral 212). It should be appreciated that these configurations may involve one or more SS7 networks (e.g., SS7 network 452) or one or more IP networks (e.g., internal IP network or intranet 454, leased external IP network or extranet 456).

Continuing to refer to FIG. 4B, those skilled in the art should readily appreciate upon reference hereto that because of the multiple signaling network configurations available between the two nodes 460A and 460B, link failover or changeover (hereinafter "changeover," collectively) may be advantageously implemented in the exemplary nodal arrangement 450. Further, such link changeover/failover (which can be from a traditional SS7 link to an SS7-over-IP link and vice versa) may be effectuated based on a number of considerations, e.g., Quality of Service (QOS), link reliability, bandwidth constraints, packet loss, link availability, traffic congestion, rate scheme(s) and service options/preferences, et cetera. The M2PA layer's functionality and relevant message flows for effectuating a link changeover will be set forth in greater detail in the subsequent portions of the Detailed Description.

Figures 5A, 5B:
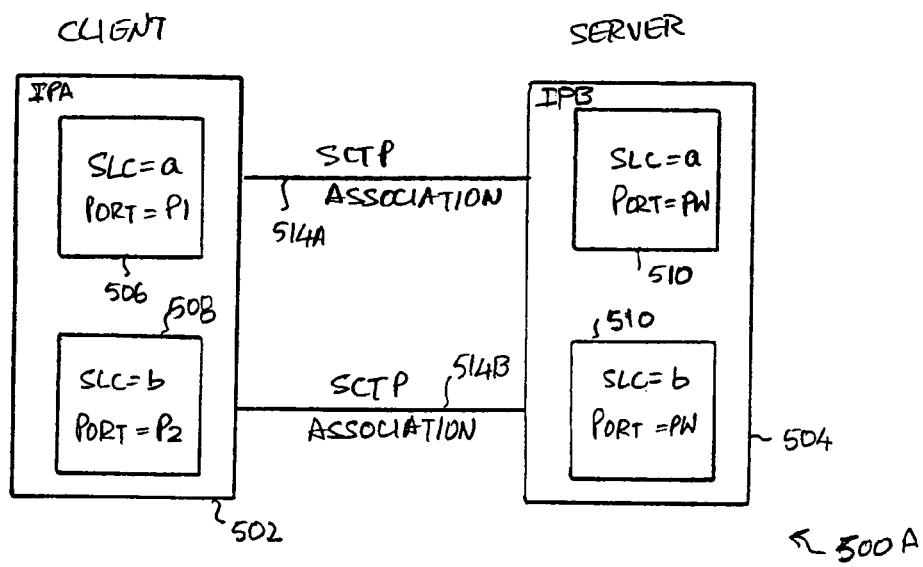
FIGS. 5A and 5B depict an example of the formation of an SCTP association between two nodes disposed in a client-server relationship.

FIGS. 5A and 5B depict an example of the formation of an SCTP association between two nodes or endpoints disposed in a client-server relationship, which association is utilized for the transport of SS7 messages over IP. As is well known, the SCTP protocol is preferably provided as a reliable, connection-oriented transport protocol operating on top of a connectionless packet switched network such as an IP network, and may be viewed as a layer between an SCTP user application (referred to as "SCTP user," which in the context of the present patent application comprises the M2PA layer structure) and the underlying connectionless IP network. The basic service offered by SCTP is the reliable transfer of user messages between peer SCTP users by means of an association between two SCTP endpoints. Because SCTP provides in-sequence delivery, related functionality may be removed from the MTP2 functionality. Accordingly, the M2PA layer (operating as the SCTP user) does not necessarily have to include such related functionality. However, since SCTP does not provide functions related to MTP2 layer's Link State Control, these functions are included in the functionality of the M2PA layer.

In order to support peer-to-peer communication using SCTP, MTP2 layer's Message Signal Units (MSUs) are passed by M2PA to SCTP as User Data messages for transport across a link. Also, MTP2 layer's Link Status Signal Units (LSSUs) (which allow peer MTP2 layers to exchange status information) are passed by M2PA as Link Status messages. On the other hand, the M2PA layer need not generate any special messages for the transport of MTP2 layer's Fill-In Signal Units (FISUs), as these are typically sent when no other SS7 signal units are waiting to be sent, and this purpose is served by the heartbeat messages provided in SCTP. In addition, because the message acknowledgment functionality of the FISUs is also addressed by SCTP, such functionality may not be needed in the M2PA layer.

As is well known, Transmit Sequence Numbers (TSNs) are used by SCTP for reliable delivery of messages. Further, SCTP uses Stream Sequence Numbers (SSNs) for effectuating sequential delivery of messages within each stream. On the other hand, the MTP2 layer uses Forward and Backward Sequence Numbers (FSNs/BSNs) for message sequencing, which are of different size than the TSN/SSNs supported by SCTP. Accordingly, the M2PA functionality includes mapping between the TSN/SSNs and FSN/BSNs, wherein appropriate modular conversion procedures are employed.

Because SCTP uses larger sequence numbers than MTP, the MTP3 layer's Changeover procedure preferably uses the Extended Changeover Order (XCO) and Extended Changeover Acknowledgment (XCA) messages as described in the ITU Recommendation Q.2210, incorporated by reference herein. The use of SCTP SSNs is particularly described in the context of link changeover procedures set forth hereinbelow.

Pursuant to the formation of an association, each SCTP endpoint provides the other endpoint with a list of transport addresses (e.g., one or more IP addresses in combination with an SCTP port) through which that endpoint can be reached and from which it will originate SCTP packets. The association spans transfers over all of the possible source/destination combinations which may be generated from each endpoint's lists. Additional details regarding SCTP architecture may be found in the work in progress Internet Draft identified as <draft-ietf-sigtran-sctp-13.txt>which is incorporated by reference herein.

Continuing to refer to FIG. 5A, a client node 502 and a server node 504 are provided in the exemplary network arrangement 500A. To prevent duplicate associations from being established, the client/server relationship is determined in advance. That is, it is decided beforehand as to which endpoint initiates the establishment of an association (i.e, operates as a client). The other endpoint is of the endpoint pair operates as the server. It should be realized that an endpoint may be a client in its relationship with one endpoint, and a server in its relationship with another endpoint.

The client 502 initiates the association using the server's IP address and the M2PA structure's port number as the destination endpoint. In order to allow for multiple links between the two endpoints, the client uses a different local port number for each link. Preferably, it is decided in advance which local ports are to be used by the client. During the initialization in accordance with the SCTP procedures, addresses of the client ports are made available to the server 504. Each combination of client IP address/port and server IP address/port uniquely identifies an association between the two endpoints. And, each association is mapped to the same Signaling Link Code (SLC) in the client and server, which defines a common reference number for a link between two peer MTP3 entities.

Accordingly, based on the foregoing, it should be realized that a link is preferably implemented as an SCTP association identified by two endpoints, a client and server, wherein each endpoint is identified by an IP address and port number. Each association, in turn, corresponds to an SLC. As depicted in FIG. 5A, IPA and IPB refer to the two IP addresses of the client and server, respectively. P1 and P2 refer to the pre-selected port numbers for the client (wherein reference numerals 506 and 508 exemplify the client ports) and PW refers to the port number for M2PA (wherein reference numeral 510 exemplifies the M2PA port). A first SCTP association 514A (identified as SLC=a) is thus established using the combination IPA/P1 and IPB/PW. A second SCTP association 514B (identified as SLC=b) is similarly established between the endpoints using the combination IPA/P2 and IPB/PW. These source/destination address combinations are provided as a table 500B in FIG. 5B.

Each association preferably contains two streams in each direction (not shown). In a presently preferred exemplary embodiment of the present invention, Stream 0 is designated for Link Status messages, whereas Stream 1 is designated for User Data messages.

If SCTP fails to establish an association after the M2PA has received a Start command from its MTP3 layer, the M2PA preferably responds by reporting that the link is out of service. If the M2PA has an association ID for that association, it may be aborted thereafter by using an Abort primitive. Once the association is established, the M2PA layer invokes a GetSRTTReport primitive to determine a Smooth Round Trip Time (SRTT) parameter from SCTP. If the SRTT parameter is found to be satisfactory and the link has not been deactivated by the MTP3 layer, various link management procedures are carried out to verify the link's integrity. Thereafter, the signaling bearer traffic is loaded or placed onto the link for transport.

Figure 5C:
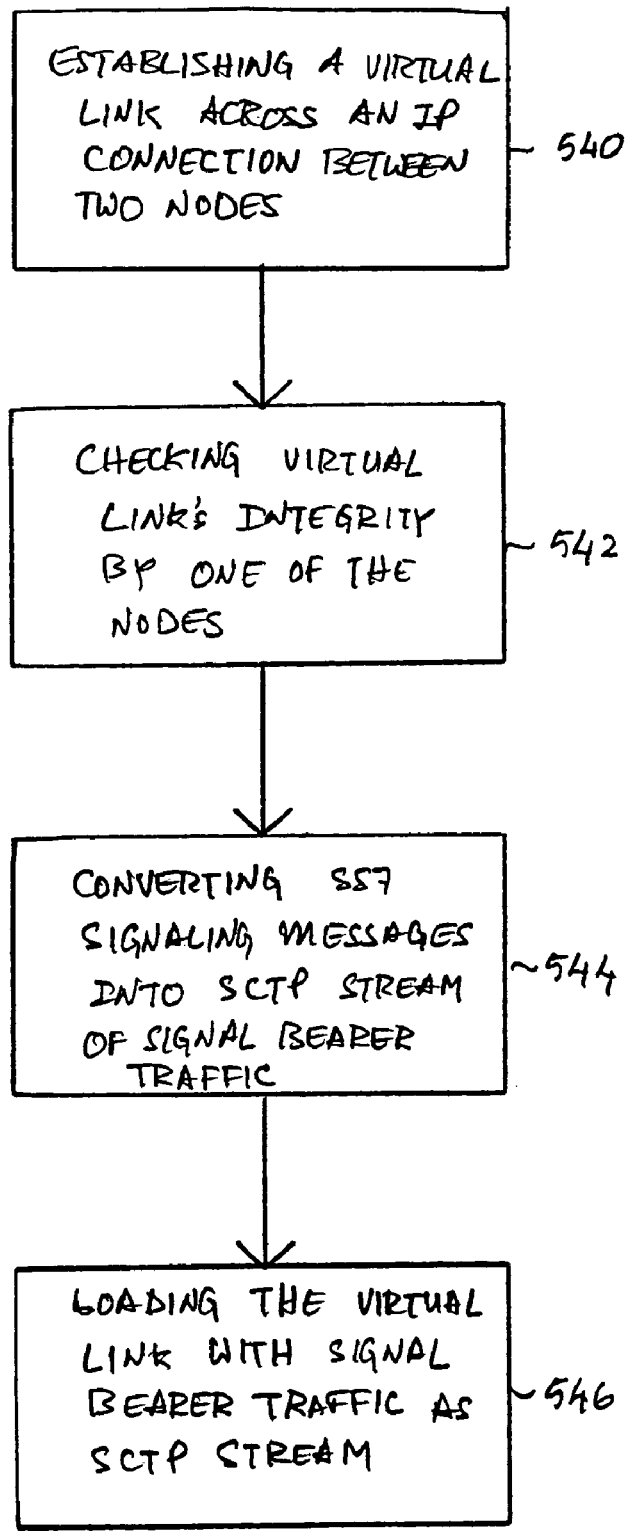
FIG. 5C is a flow chart of the steps involved in an exemplary method for transporting SS7 messages over an IP connection.

FIG. 5C depicts a flow chart which summarizes the steps involved in an exemplary method for transporting SS7 messages in accordance herewith. A virtual link is established over an IP connection by means of an SCTP association as described hereinabove (step 540). Upon verifying the virtual link's integrity (step 542), the SS7 messages are converted to an SCTP stream of signaling bearer traffic (step 544). The virtual link is loaded with the traffic thereafter for transport to the destination endpoint (step 546).

To seamlessly effectuate the symmetrical peer-to-peer protocol adaptation functionality as described hereinabove, the following services are provided by the M2PA functionality:

The SS7 MTP3/MTP2 (i.e., MTP2-user) interface is retained at the termination point in the IP network;
The M2PA layer provides the equivalent set of services to its user as provided by MTP2 to MTP3;
Support for MTP3/MTP2 interface boundary; and
Support for peer-to-peer communication.
The M2PA functionality includes the following:
Mapping: For each IP link, the M2PA layer maintains a map of the SS7 link to its SCTP association and its corresponding IP destination;
SCTP Stream Management: SCTP allows a user-specified number of streams to be opened during the initialization. It is the responsibility of the M2PA layer to ensure proper management of the streams associated within each association; and
Retention of MTP3: The M2PA layer allows MTP3 to perform all of its Message Handling and Network Management functions with IPSPs as with other SS7 nodes.

In a presently preferred exemplary embodiment of the present invention, the protocol messages for M2PA are preferably provided with a message header structure which contains a version, message type, and message length. This message header is preferably provided to be common among all PPA structures in a network. As pointed out in the foregoing sections, the M2PA layer supports two types of messages: User Data messages (corresponding to the MSUs) and Link Status messages (corresponding to the LSSUs). In MTP, LSSUs have priority over MSUs. To accommodate this priority in M2PA functionality, Link Status and User Data messages are sent via SCTP on separate streams as described in the SCTP association formation above.

Referring now to FIGS. 6A and 6B, depicted therein are various message flows for effectuating the M2PA layer structure in accordance with the teachings of the present invention. Message flows among the various layers (which layers are illustrated as distinct "inter-layer message nodes" for the sake of clarity) of a protocol stack structure provided at an IPSP node (e.g., node 206A) are exemplified.

Message flow portion 606A illustrates basic message transmission and reception between MTP3 602A and M2PA 603A. Messages are transmitted using a Data Request primitive 608 from MTP3 602A to M2PA 603A. Messages are received using a Data Indication primitive 610 from M2PA 603A to MTP3 602A.

When MTP3 602A sends a message for transmission to M2PA 603A, M2PA 603A adds the M2PA header to the message and passes it to SCTP 604A using a Send primitive 609. When M2PA 603A receives a Data message 611 from SCTP 604A, it removes the header and passes the message to MTP3 602A.

Message flow portion 606B illustrates messages for effectuating link status indication. Upon receiving a Communication Up message 612 from SCTP 604A, M2PA performs link proving (step 614). Thereafter, a Link_In_Service message 614 is transmitted by M2PA 603A to MTP3 602A. In response to a Communication Lost message 616 is received from SCTP 604A, M2PA 603A sends a Link_Out_Of_Service message 618 to MTP3 602A.

The MTP3 layer in an IPSP node can request that an SS7 link be brought into alignment using normal or emergency procedures. During normal alignment, communication to the other endpoint is tested for a period of time in order to ensure that the communication link satisfies certain performance requirements such as, e.g., the SRTT/RTT and packet loss. Normal alignment is used when there are other links associated with the affected link, wherein the other links are operable to the same destination. Emergency alignment is used when there are no other links to the same destination. During emergency, the link is not tested for a "long" period of time, but instead an indication from SCTP is used to bring the link in-service.

An example of the message flow to bring an SS7 link in-service using the normal alignment procedure is shown in message flow portion 606C. Link alignment is established when MTP3 602A sends a Start message 620 to M2PA 603A. To begin alignment in M2PA 603A, M2PA sends an Associate primitive (not shown) to SCTP 604A if the SCTP association is not already established. Responsive to the Start message 620, M2PA 603A transmits an Establish Response 622 to MTP3 602A.

An example of the message flow to bring an SS7 link in-service using the emergency alignment procedure is provided in message flow portion 606D. A Status Emergency Request 624 is transmitted from MTP3 602A to M2PA 603A. A Status Response 626 is provided responsive thereto. An Establish_Start Request 628 is subsequently sent from MTP3 602A to M2PA 603A. Responsive thereto, M2PA 603A transmits an Establish Response 630 to MTP3 602A. It should be noted, however, that once an Emergency Request is transmitted and accepted using a channel (link), that condition remains on that channel until an Emergency Ceased message is received or a Management Channel Reset message.

Message flow portion 606E exemplifies messages for effectuating link proving during emergency. Upon receiving an Emergency notification 632 from MTP3 602A, link proving in M2PA 603A is disabled (step 634). When a Communication Up message 636 is received from SCTP 604A, M2PA 603A responds by propagating a Status request 638 to SCTP 604A in order to ensure that a performance parameter (e.g., SRTT/RTT) satisfies the requirements of the particular communication application. After verifying the link integrity, a Link_In_Service 640 is sent from M2PA 603A to MTP3 602A.

Message flow portion 606F exemplifies messages for effectuating link proving when emergency is ceased. Upon receiving an Emergency Ceased notification 642 from MTP3 602A, link proving in M2PA 603A is enabled (step 644). After receiving a Communication Up message 646 from SCTP 664A, M2PA 603A responds by transmitting Status SRTT/RTT messages 648 to SCTP 604A for a predetermined time duration (e.g., 3 seconds). Subsequent to verifying that the SRTT/RTT values satisfy applicable performance requirements, a Link_In_Service 650 is transmitted to MTP3 602A from M2PA 603A.

FIGS. 7–14 depict message flow diagrams for effectuating various exemplary M2PA procedures involving a link disposed between two nodes, e.g., endpoints 206A and 206B, wherein appropriate protocol layers are once again provided as "inter-layer message nodes" for illustrative purposes.

Referring in particular to FIG. 7, depicted therein is a message flow diagram which illustrates messages for effectuating link initialization involving endpoints 206A and 206B. It should be appreciated that the messages exemplified in FIG. 7 are essentially similar to the messages exemplified in some of the message flow portions described hereinabove with respect to FIGS. 6A–6B. Accordingly, only the pertinent features are highlighted in detail herein.

The message flow depicted in FIG. 7 provides an example of the message flow to bring an SS7 link in-service. While proving is done by both ends of the link, it is shown for one node only (node 206A) for the sake of simplicity. An Out_Of_Service message 702 propagated between M2PA 603A and MTP3 602A indicates that the link between nodes 206A and 206B is taken out of service. An Emergency or Emergency Ceases message 704 is sent from MTP3 602A to M2PA 603A, as the case may be, in order to commence a suitable alignment procedure as described above. A Start message 706 from MTP3 602A to M2PA 603A initiates the process. Responsive to the Start message, M2PA 603A sends an Associate primitive 708 to SCTP 604A. Thereafter, SCTP 604A engages in a suitable SCTP association procedure 710 with its peer SCTP 604B in node 206B. Upon successful formation of an association between SCTP 604A and 604B, a Communication Up message 712 is propagated from each SCTP back to its M2PA.

Figure 8:
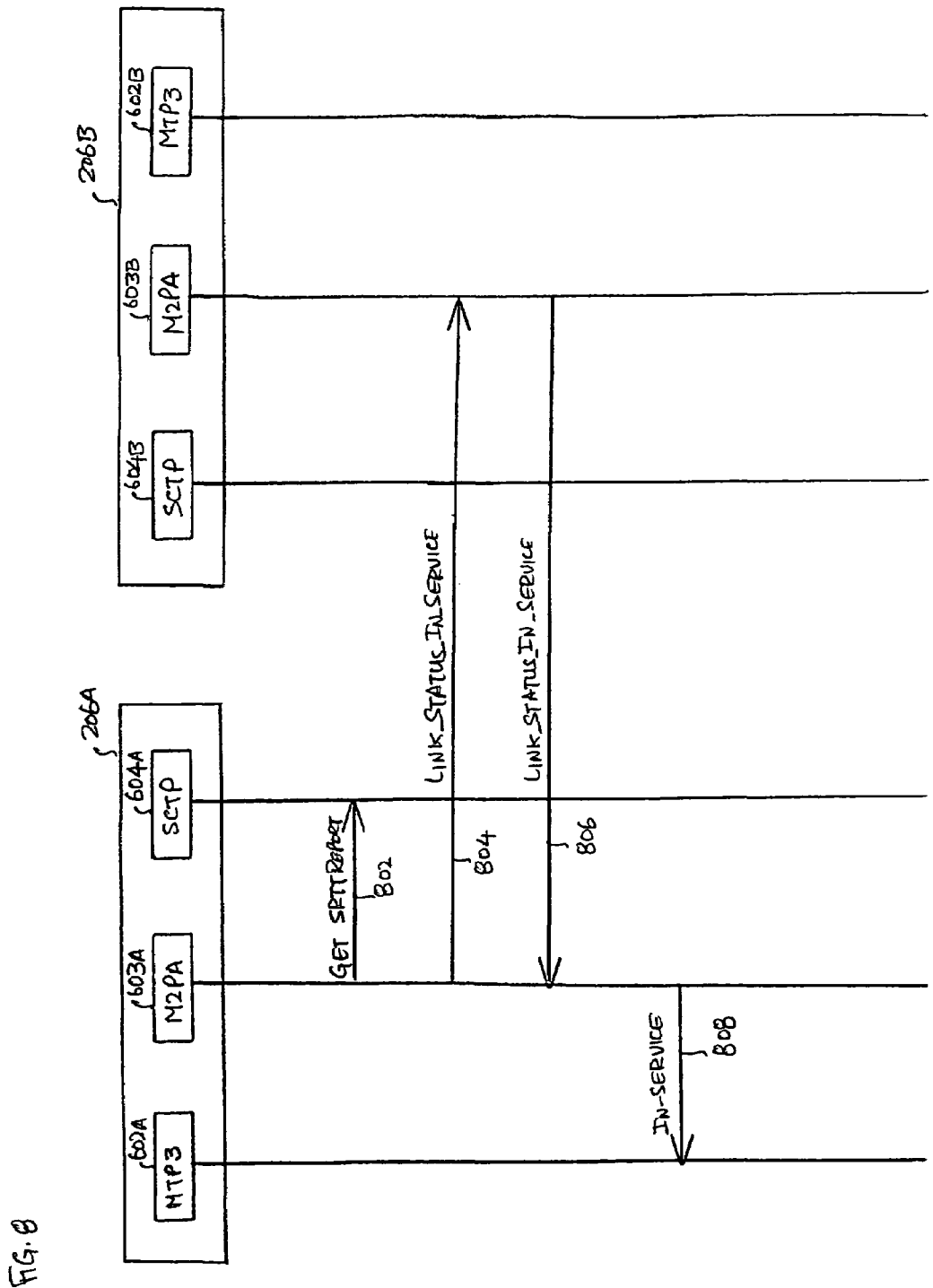
FIG. 8 depicts a message flow diagram for effectuating link confirmation in accordance with the teachings of the present invention.

FIG. 8 depicts a message flow diagram for effectuating link confirmation after the SCTP association is established. It should be appreciated that even though an SCTP association may have been established, it is important that M2PA not send MTP3 data at this point until it is confirmed that both ends of the link are ready for traffic. Otherwise, messages could be lost. The link is confirmed for traffic when the endpoints exchange In_Service messages. Upon initiating a GetSRTTReport primitive 802 from M2PA 603A to its SCTP 604A, a peer-to-peer exchange of Link_Status_In_Service messages 804 and 806 is carried out between M2PA 603A in node 206A and M2PA 603B in node 206B. Thereafter, an In_Service message 808 is propagated from M2PA 603A to its MTP3 602A to indicate that the link is ready for traffic. At this point, MTP3 602A may begin sending data messages.

Figure 9:
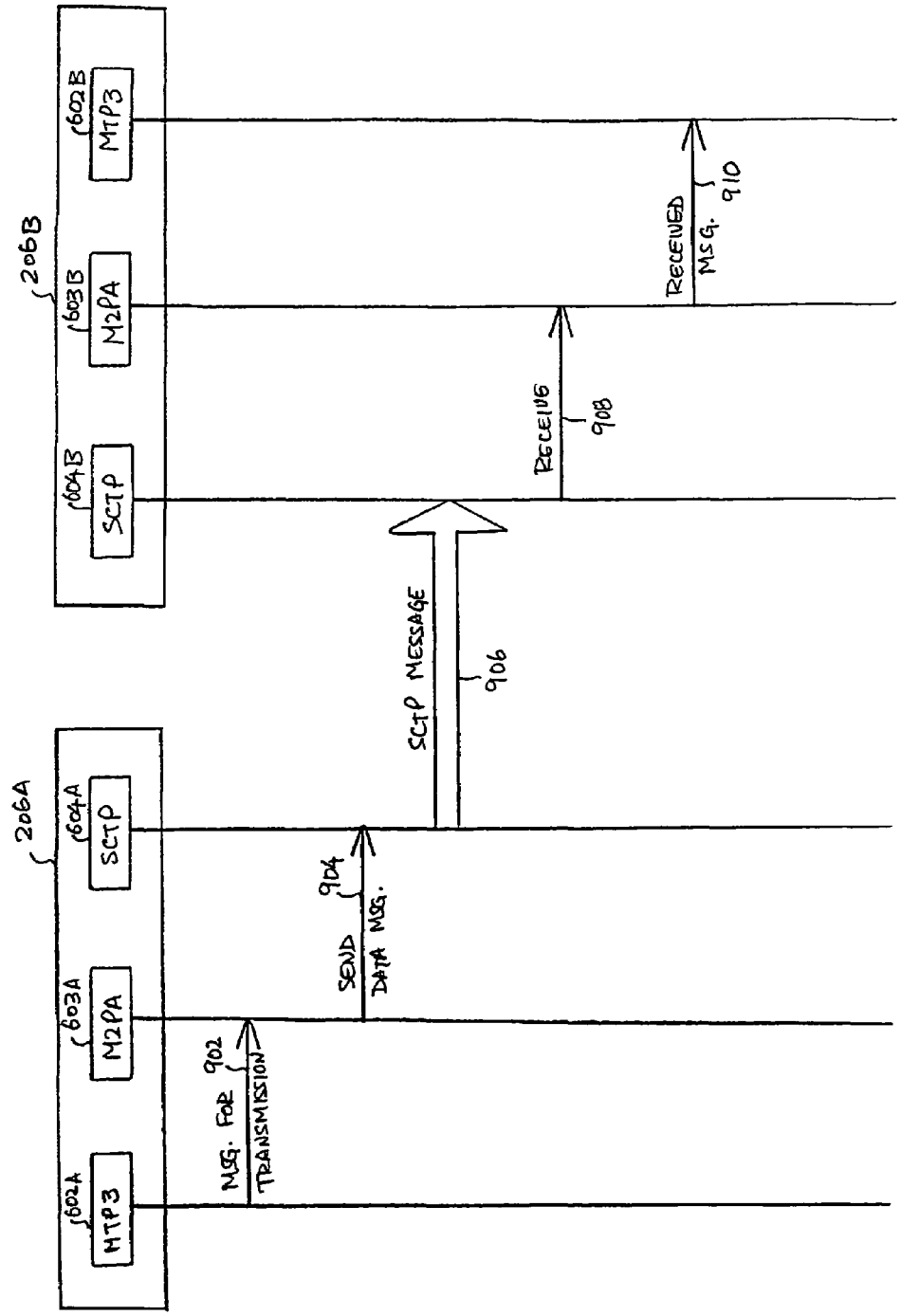
FIG. 9 depicts a message flow diagram for effectuating message transmission and reception in accordance with the teachings of the present invention.

FIG. 9 depicts a message flow diagram for effectuating end-to-end message transmission and reception. As set forth in reference to the message flow portions depicted in FIGS. 6A and 6B, appropriate transmission and reception primitives are used between MTP3 and M2PA. Upon receiving a message for transmission via a suitable primitive 902 from MTP3 602A, M2PA 603A generates a Send primitive 904 to its SCTP 604A including the data message. Thereafter, SCTP 604A transports the message to its peer SCTP 604B in node 206B using known SCTP procedures 906. SCTP 604B transmits a Receive primitive 908 to its M2PA 603B with the data message. The received data message is then sent to MTP3 602B via a Data Indication primitive 910.

Figure 10:
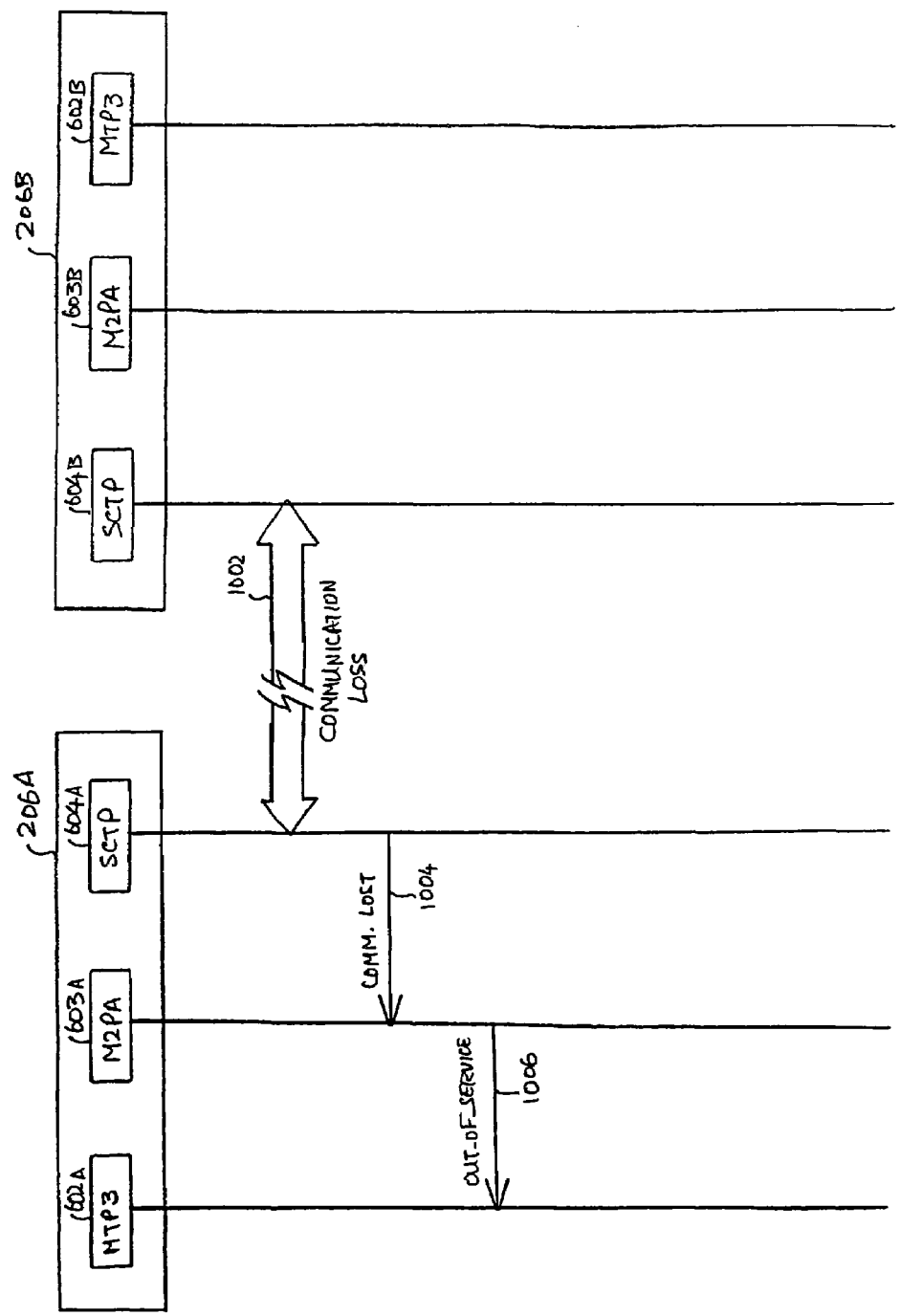
FIG. 10 depicts a message flow diagram for effectuating link status indication in accordance with the teachings of the present invention.

FIG. 10 depicts a message flow diagram for effectuating link status indication. When SCTP 604A detects a communication loss 1002 (due to, e.g., loss of association, etc.), it sends a Communication Lost primitive 1004 to its M2PA 603A. Preferably, the detection is effected at a client node in the client/server pair. Upon receiving the Communication Lost primitive 1004, M2PA 603A notifies MTP3 that the link is out of service. An Out_Of_Service primitive 1006 is used for this purpose.

Figure 11:
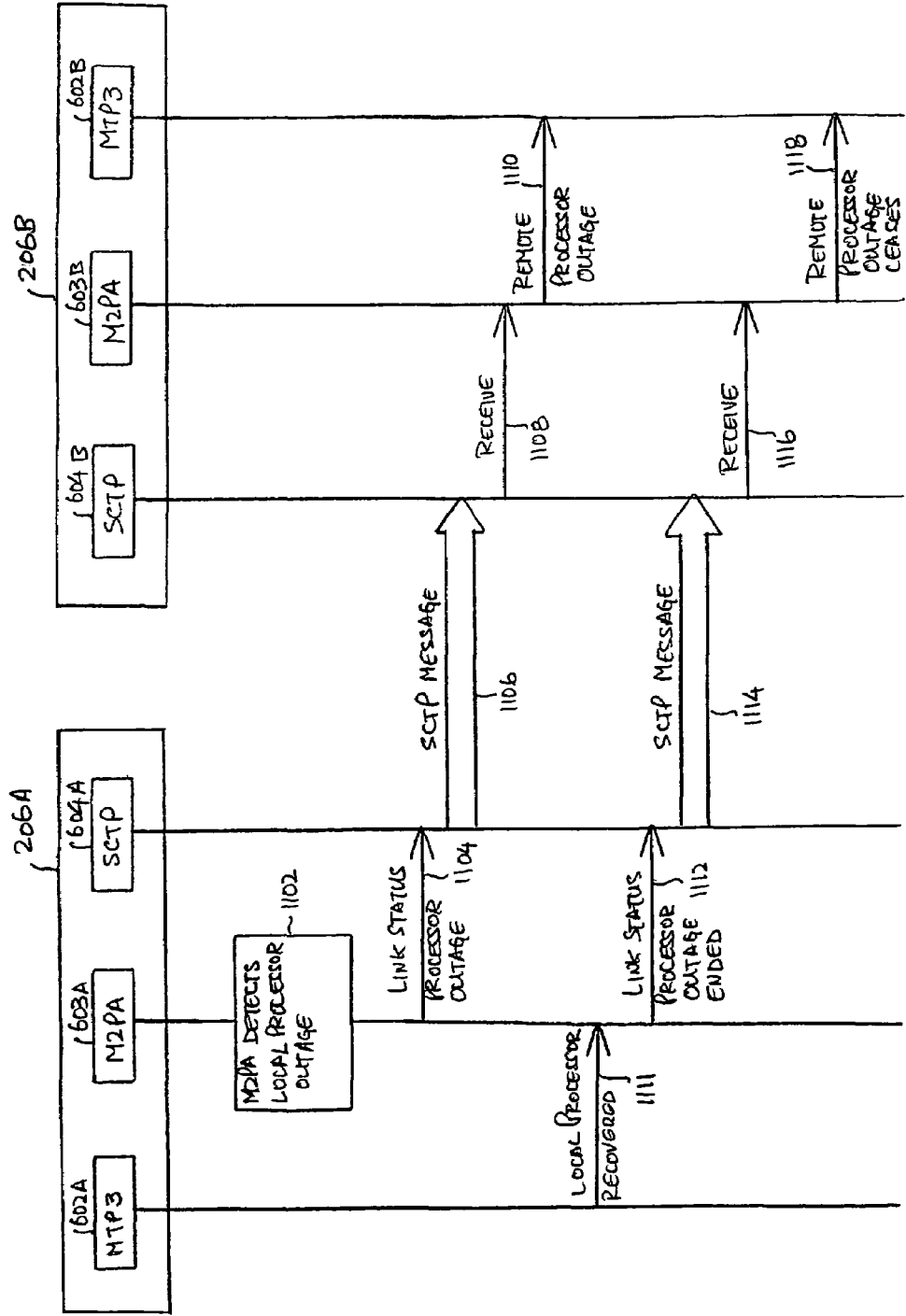
FIG. 11 depicts a message flow diagram for indicating processor outage in accordance with the teachings of the present invention.

FIG. 11 depicts a message flow diagram for indicating processor outage. Preferably, a processor outage is deemed to exist when M2PA cannot transfer messages because of a condition at a higher layer than M2PA. When M2PA 603A detects a local processor outage (step 1102), it sends a Link Status Processor Outage message 1104 to its peer M2PA 603B, with status being Processor Outage. This message flow is effectuated via SCTP messaging 1106 and Receive primitive 1108 between SCTP 604B and M2PA 603B. The peer M2PA (i.e., M2PA 603B in this example), upon receiving the Link Status Processor Outage message, reports Remote Processor Outage 1110 to its MTP3 602B. The M2PAs discard any messages received and also cease sending messages.

When the processor outage ceases, MTP3 602A sends a Local Processor Recovered indication 1111 to the local M2PA, i.e., M2PA 603A. The local M2PA notifies its peer by sending Link Status message 1112, with status being Processor Outage Ended. Again, this is effectuated via SCTP messaging 1114 and Receive primitive 1116 between SCTP 604B and M2PA 603B. In response, M2PA 603B notifies its MTP3 602B that the remote processor outage has ceased (message 1118).

Figure 12:
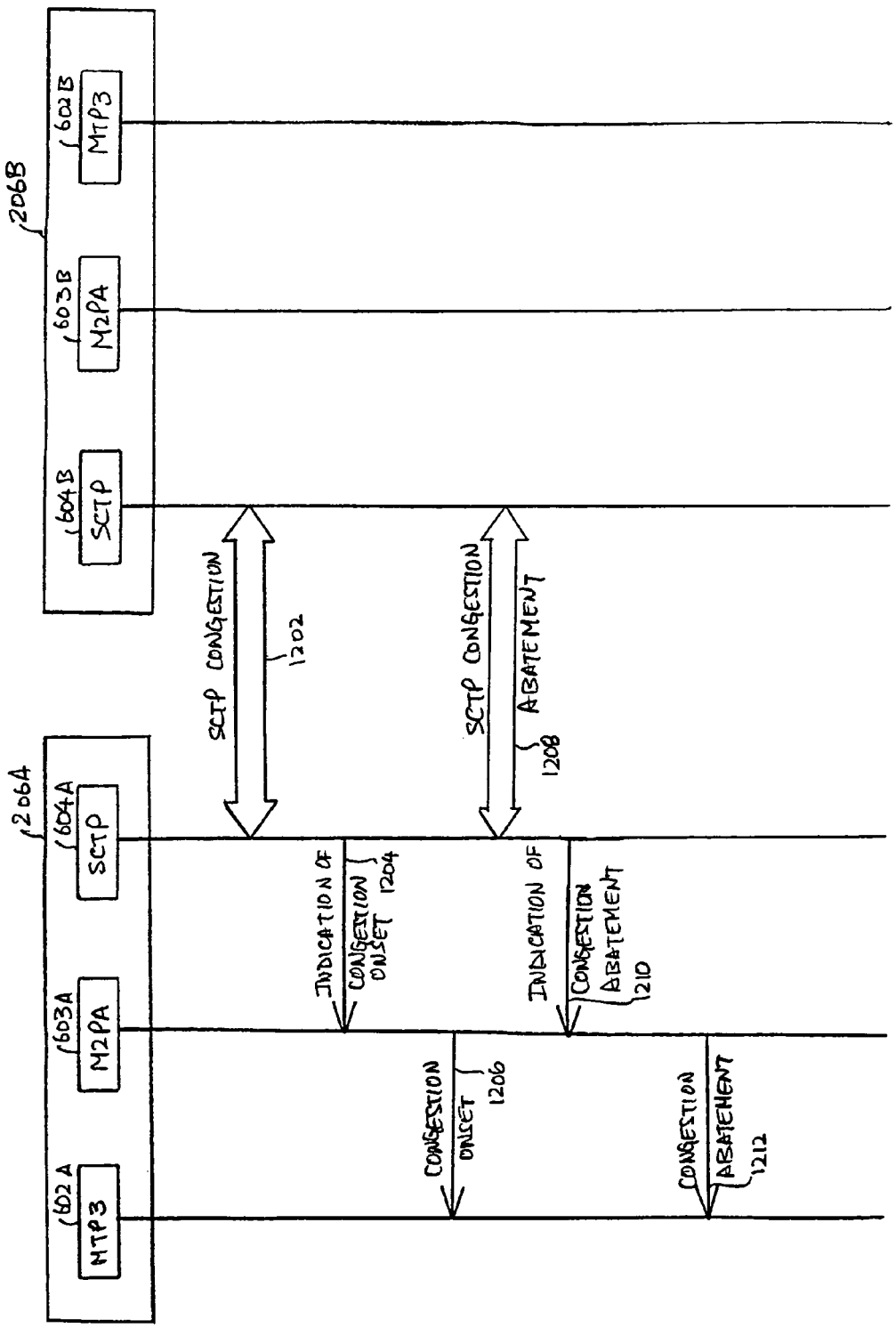
FIG. 12 depicts a message flow diagram for effectuating congestion notification in accordance with the teachings of the present invention.

FIG. 12 depicts a message flow diagram for effectuating congestion notification. When SCTP 604A detects congestion 1202 or, depending upon implementation, when M2PA 603A notices repeated failures to Send requests to its SCTP, an indication of congestion onset 1204 is reported to M2PA 603A. MTP3 602A is then notified of link congestion by a Congestion Onset 1206 (Link_Congested primitive). If the congestion condition exceeds a predetermined period of time, MTP3 602A may take the link out of service (by means of a Stop message, for example).

Indication of congestion abatement is also implementation-specific. SCTP may detect a congestion abatement condition 1208 and then notify M2PA 603A (via indication 1210). Also, M2PA 603A may poll the status of its SCTP by transmitting a plurality of Status messages over a period of time. Successful transmission of the Status messages may indicate congestion abatement 1210. Upon determining abatement, M2PA 603A notifies MTP3 602A of congestion abatement 1212 (Link_Congestion_Ceased primitive).

Figure 13:
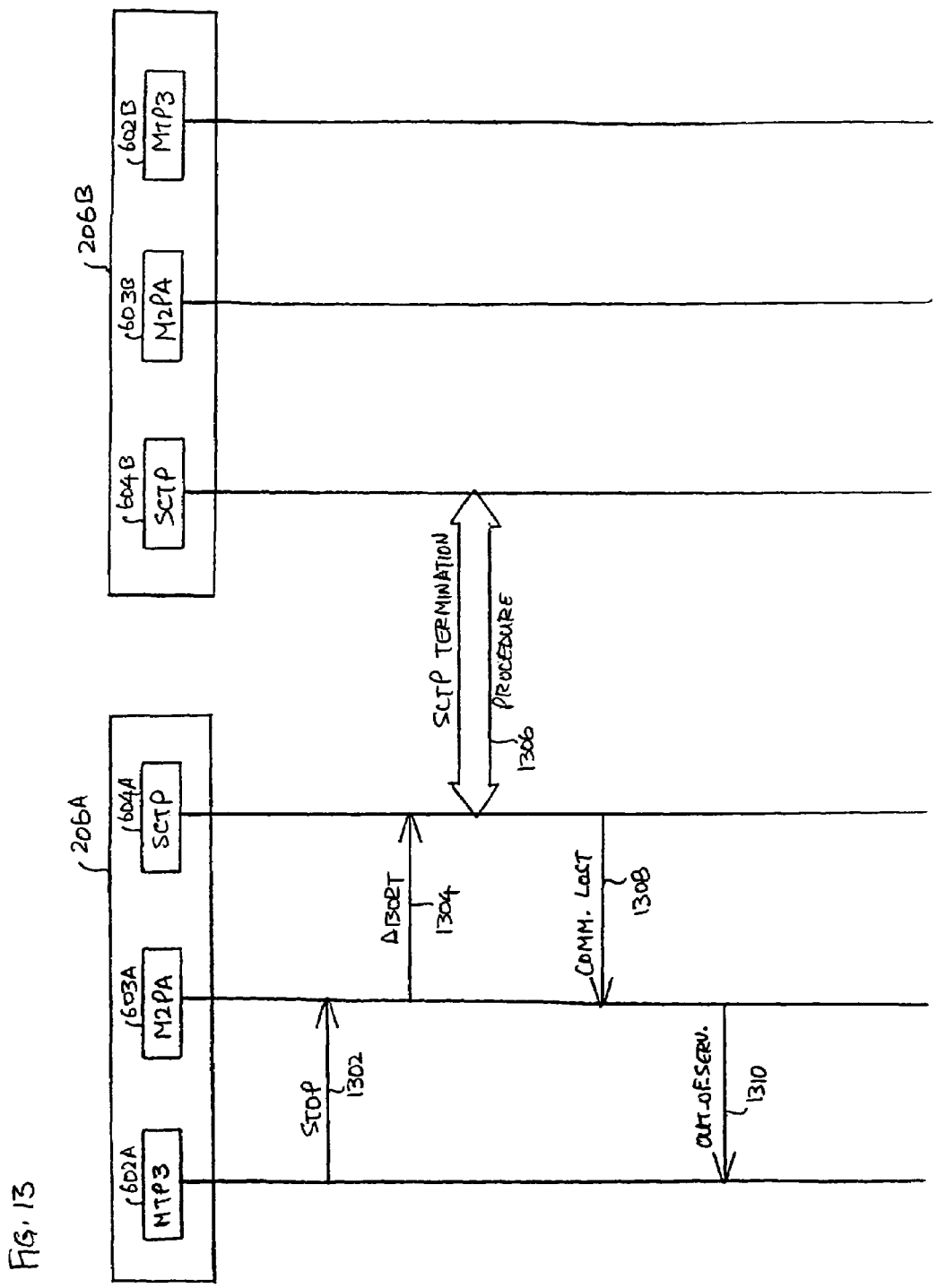
FIG. 13 depicts a message flow diagram for effectuating link deactivation in accordance with the teachings of the present invention.

FIG. 13 depicts a message flow diagram for effectuating link deactivation upon issuing a Stop message 1302 from MTP3 602A to its M2PA 603A. In response, M2PA 603A sends an Abort message 1304 to SCTP 604A. Subsequently, SCTP 604A engages in a known termination process 1306 so that its association with peer SCTP 604B is deactivated. Thereafter, SCTP 604A generates a Communication Lost primitive 1308 to its M2PA 603A, which issues an Out_Of_Service primitive to MTP3 602A.

FIG. 14 depicts a message flow diagram for effectuating link changeover/failover in accordance with the teachings of the present invention. As may be readily appreciated, the objective of the changeover is to ensure that signaling traffic carried by the unavailable signaling link (due to congestion, packet loss, link failure, etc.) is diverted to an alternative signaling link as quickly as possible while avoiding message loss, duplication, or mis-sequencing. Accordingly, the presently preferred exemplary embodiment of the present invention includes data retrieval as part of the changeover procedure, which is performed before opening the alternative signaling link or links.

Data retrieval comprises the following steps:
   buffer updating, that is, identifying all those messages (e.g., User Data messages) in the retransmission buffer of the unavailable link which have not been received by the remote SCTP, as well as untransmitted messages, and
   transferring those messages to the transmission buffers of the alternative links.

In order to support changeover in M2PA, the SCTP sequence numbers are used in place of the SS7 protocol's FSNs and BSNs. For the purposes of the present invention, SCTP sequence numbers and SS7's FSNs/BSNs will be collectively referred to as "message sequence numbers." As alluded to hereinbefore, SSNs used by SCTP are 16 bits long while MTP2's FSNs/BSNs are 7-bit values. Accordingly, XCO and XCA messages are utilized rather than the Changeover Order (COO) and Changeover Acknowledgment (COA) messages.

For data retrieval, MTP3 requests a BSN from its M2PA. This is the sequence number of the last message received by the local endpoint. Normally, SCTP delivers ordered messages to the MTP application. However, during congestion or failure condition, the sequence numbers of the acknowledged messages may have gaps. In particular, the Selective Acknowledgment (SACK) message(s) can have several of such gaps. Accordingly, it is preferable to scan through these gaps and find the sequence number before the first gap. For reliable reconstruction of the transmission, this is the sequence number from which the remote endpoint has to transmit the messages. Therefore, this sequence number is identified as the BSN by the local endpoint and communicated to the other endpoint (i.e., the remote endpoint). In a similar fashion, the remote endpoint also detects a BSN from its end and communicates it to the local endpoint. Once the local endpoint's MTP receives this BSN, it retrieves all the unacknowledged messages starting from this number. This retrieval is accomplished through a Retrieval Request and FSNC request, where FSNC equals BSN from the XCA message. After all the messages are sent from M2PA to MTP3 at the local end, a Retrieval Complete indication is sent.

It should be recognized that the sequence numbers and messages requested by MTP3 may be obtained by M2PA from SCTP via a Communication Lost primitive. In this alternative approach, it is necessary that SCTP be provided with the message retrieval capability. Accordingly, the SSNs of the messages need to be identified and SCTP may be required to retain the messages for a predetermined time in order for retrieval by MTP3/M2PA whenever an association is aborted. Subsequently, SCTP must be able to return messages to its upper layer (i.e., M2PA) by means of appropriate stream(s), and based on SSNs.

If M2PA receives a Retrieve BSNT request from MTP3, M2PA responds with a BSNT indication. The BSNT value is the SCTP SSN of the last message received by SCTP User Data stream before any gaps in its SSNs. If there are any messages with an SSN greater than this BSNT value have been acknowledged by SCTP but not have been passed up to M2PA, such messages need to be retransmitted by the far end on an alternative link.

If M2PA retrieves a Retrieval Request and FSNC request from its MTP3, M2PA retrieves from SCTP the following:
  (A) any transmitted messages beginning with the first acknowledged message with SSN greater than FSNC; and
  (B) any untransmitted messages in SCTP.

Each of these messages is sent to MTP3, preferably in the order of (A) and then (B). Thereafter, as alluded to before, M2PA sends a Retrieval Complete indication to MTP3.

The message flow depicted in FIG. 14 exemplifies the foregoing procedures in a message flow diagram, wherein the local and far endpoints are illustrated by nodes 206A and 206B, respectively. Upon receiving a Communication Lost primitive 1402 from SCTP 604A, M2PA 603A sends an Out_Of_Service primitive 1404 to MTP3 602A. Subsequently, a Retrieve BSN request 1406 is issued to M2PA 603, whereupon M2PA locates the first gap in the received messages (step 1408), as explained in the foregoing. The BSN is then communicated to MTP3 602A via an Indicate BSN primitive 1410.

An XCO message 1412 on another link is communicated by MTP3 602A to its peer in the far endpoint, i.e., MTP3 602B, with the BSN value. The remote MTP3 602B sends a Retrieve BSN request to its M2PA 1414 which then responds with a BSN indication 1416. An XCA message 1418 with the BSN retrieved from the remote M2PA 603B is then exchanged with the local MTP3 602A.

A Retrieval Request and FSNC request 1420 is then forwarded to M2PA 602A at the local end. As pointed out before, FSNC equals the BSN value received from the far end via the XCA message 1418. Subsequently, M2PA locates the first gap in the acknowledgment messages (step 1422) and re-sends the messages from there on (retrieved messages 1424). Upon completion of retransmission, a Retrieval Complete indication 1426 is communicated to MTP3 602A, which may transmit the messages on another link.

Based on the foregoing, it should be appreciated that the present invention advantageously provides a symmetrical peer-to-peer protocol adaptation solution for facilitating the transport of SS7-over-IP which avoids the shortcomings and deficiencies of the state-of-the art. A high speed IP link may be maintained between two SS7 nodes, e.g., between SEP/STP and STP/SCP combinations, in order to take advantage of the packet transport mechanism while still ensuring carrier-grade connectivity and reliability. The PPA structure and functionality as embodied in the M2PA layer may be provided to enhance the functionality of existing STPs for supporting Voice-over-IP. In particular, nodes or network elements such as, e.g., Signaling Gateways, Access Gateways, Trunking Gateways, other Media Gateways and Media Gateway Controllers, may be provided with additional functionality in accordance with the teachings of the present invention for the provisioning of known and heretofore unknown IN/AIN-based services, involving voice, data, video, audio, interactive multi-media, and the like, over IP-based networks.

It is believed that the operation and construction of the present invention will be apparent from the foregoing Detailed Description. While the apparatus and method shown and described have been characterized as being preferred, it should be readily understood that various changes, modifications and enhancements could be made therein without departing from the scope of the present invention as set forth in the following claims.

What is claimed is:

1. A link changeover method in an IP-based telecommunications network for transporting SS7 signaling information, said network including a local node and a remote node, wherein each of said nodes includes an MTP3 (Level-3 Message Transfer Part) structure, an M2PA (Level-2 Message Transfer Part—user peer-to-peer adaptation) structure, and an SCTP (Stream Control Transmission Protocol) structure comprising the steps of:
  establishing a link between said local and remote nodes by creating an association therebetween;
  detecting, by at least one of said local and remote nodes, that a select condition related to said association has occurred;
  receiving, by an M2PA structure in one of said nodes, a message from the MTP3 structure in said one node, requesting a selected sequence number;
  determining said selected sequence number, by said M2PA structure in said one node, by locating the first gap in selected messages;
  responsive to said detection step and said determining step, exchanging message sequence number information between said local and remote nodes on an alternative link established therebetween; and
  based on said message sequence number information, retransmitting messages over said alternative link, said messages starting at a predetermined sequence number.

2. The link changeover method in an IP-based telecommunications network for transporting SS7 signaling information as set forth in claim 1, wherein said message sequence number information comprises SCTP sequence number information.

3. The link changeover method in an IP-based telecommunications network for transporting SS7 signaling information as set forth in claim 1, wherein said message sequence number information comprises SS7 sequence number information.

4. The link changeover method in an IP-based telecommunications network for transporting SS7 signaling information as set forth in claim 3, wherein said SS7 sequence number information comprises Forward Sequence Number information.

5. The link changeover method in an IP-based telecommunications network for transporting SS7 signaling information as set forth in claim 3, wherein said SS7 sequence number information comprises Backward Sequence Number information.

6. The link changeover method in an EP-based telecommunications network for transporting SS7 signaling information as set forth in claim 3, wherein said select condition related to said association comprises a Quality of Service (QoS) condition.

7. The link changeover method in an IP-based telecommunications network for transporting SS7 signaling information as set forth in claim 3, wherein said select condition related to said association comprises a link failure condition.

8. The link changeover method in an IP-based telecommunications network for transporting SS7 signaling information as set forth in claim 3, wherein said select condition related to said association comprises a link reliability condition.

* * * * *